United States Patent
Kim et al.

(10) Patent No.: US 10,608,845 B2
(45) Date of Patent: Mar. 31, 2020

(54) METHOD FOR TRANSMITTING DATA AND ELECTRONIC DEVICE THEREFOR

(71) Applicant: Samsung Electronics Co., Ltd., Gyeonggi-do (KR)

(72) Inventors: Shin-Ho Kim, Gyeonggi-do (KR); Taesin Song, Gyeonggi-do (KR); Jinyong Jang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/316,687

(22) PCT Filed: Jun. 22, 2017

(86) PCT No.: PCT/KR2017/006591
§ 371 (c)(1),
(2) Date: Jan. 10, 2019

(87) PCT Pub. No.: WO2018/012753
PCT Pub. Date: Jan. 18, 2018

(65) Prior Publication Data
US 2019/0312755 A1    Oct. 10, 2019

(30) Foreign Application Priority Data

Jul. 11, 2016  (KR) .................. 10-2016-0087564

(51) Int. Cl.
*H04K 1/10*       (2006.01)
*H04L 25/02*     (2006.01)
(Continued)

(52) U.S. Cl.
CPC .......... *H04L 25/0272* (2013.01); *H04L 25/02* (2013.01); *H04L 25/028* (2013.01); *H04L 25/40* (2013.01); *H04L 25/4917* (2013.01)

(58) Field of Classification Search
CPC ...................... H04L 25/0272; H04L 25/4917; H04L 25/028
See application file for complete search history.

(56) References Cited

U.S. PATENT DOCUMENTS 9,148,198 B1    9/2015 Zhang et al.
9,647,666 B1 *  5/2017 Oh ................ H03K 19/018521
(Continued)

FOREIGN PATENT DOCUMENTS

KR    10-2004-0003038 A    1/2004

*Primary Examiner* — Dhaval V Patel
(74) *Attorney, Agent, or Firm* — Cha & Reiter, LLC

(57) ABSTRACT

Various embodiments of the present invention relate to an apparatus and a method for transmitting data between internal modules in an electronic device. Here, a transmission apparatus of a digital interface may comprise: multiple transmission lines connected to a reception apparatus; and multiple transmission circuits connected in parallel to each other and provided for each of the transmission lines, wherein the transmission apparatus may be configured to transmit data having different voltages to the reception apparatus, using at least one transmission circuit among the multiple transmission circuits for each of the transmission lines on the basis of a variation of the voltage of data to be transmitted through each of the transmission lines. Other embodiments are also possible.

20 Claims, 20 Drawing Sheets

(51) Int. Cl.
    *H04L 25/49*     (2006.01)
    *H04L 25/40*     (2006.01)

(56) References Cited

U.S. PATENT DOCUMENTS

| | | |
|---|---|---|
| 2002/0180518 A1 | 12/2002 | Midya et al. |
| 2014/0226734 A1 | 8/2014 | Fox et al. |
| 2016/0013926 A1* | 1/2016 | Kil ........................ H04L 7/0091 370/517 |
| 2016/0013929 A1 | 1/2016 | Kil |
| 2016/0199169 A1 | 4/2016 | Schober |
| 2016/0127159 A1 | 5/2016 | Koli |

* cited by examiner

METHOD FOR TRANSMITTING DATA AND ELECTRONIC DEVICE THEREFOR

CLAIM OF PRIORITY

This application is a National Phase Entry of PCT International Application No. PCT/KR2017/006591, which was filed on Jun. 22, 2017, and claims a priority to Korean Patent Application No. 10-2016-0087564, which was filed on Jul. 11, 2016, the contents of which are incorporated herein by reference.

TECHNICAL FIELD

Various embodiments of the present disclosure relate to an apparatus and method for data transmission between internal modules of an electronic device.

BACKGROUND ART

With the growth of information and communication technology and semiconductor technology, various electronic devices are developing into multimedia devices providing various multimedia services. The multimedia service can include at least one of a voice call service, a message service, a broadcasting service, a wireless Internet service, a camera service and a music play service.

The electronic device can provide a user with multimedia data corresponding to a quality of service desired by the user. For example, the electronic device can obtain high-resolution image data on a subject through a camera module. The electronic device can process the high-resolution image data through an image signal processor (ISP), to display the image data on a display.

DISCLOSURE OF INVENTION

Technical Problem

To improve a processing speed of multimedia data, an electronic device can increase a clock speed of an internal interface of the electronic device. However, the electronic device can have a limitation in improving the processing speed of the multimedia data by increasing the clock speed of the internal interface.

According to this, the electronic device can utilize an interface of a C-PHY scheme of setting data in four states and transmitting. For example, the C-PHY interface can transmit data, using voltage states of four forms such as high (or strong 1), mid-high (or weak 1), mid-low (or weak 0) and low (or strong 0), thereby transmitting much data than an interface of transmitting data in a digital pulse form such as high or low.

However, at data voltage state variation, due to the four voltage states, the C-PHY interface can provide different cross-points, thus causing the occurrence of switching jitter.

Various embodiments of the present disclosure may provide an apparatus and method for reducing the occurrence of jitter of an internal interface in an electronic device.

Solution to Problem

According to various embodiments of the present disclosure, a transmission apparatus of a digital interface, the apparatus includes multiple transmission lines connected to a reception apparatus, and multiple transmission circuits connected in parallel to each other and provided for each of the transmission lines, and the transmission apparatus may be configured to transmit data having different voltages to the reception apparatus, using at least one transmission circuit among the multiple transmission circuits for each of the transmission lines, on the basis of a voltage variation of data to be transmitted through each of the transmission lines.

According to various embodiments of the present disclosure, an operation method of a transmission apparatus of a digital interface which comprises multiple transmission lines connected with a reception apparatus, the method includes identifying a voltage of data to be transmitted through each of the transmission lines, selecting at least one transmission circuit to be used for data transmission among multiple transmission circuits connected in parallel to each other and provided for each of the transmission lines, on the basis of a voltage variation of data to be transmitted through each of the transmission lines, and transmitting data having different voltages to the reception apparatus through the at least one transmission circuit corresponding to a voltage variation of data for each of the transmission lines.

According to various embodiments of the present disclosure, a transmission apparatus of a digital interface, the apparatus includes multiple transmission lines connected to a reception apparatus, and at least one transmission circuit provided for each of the transmission lines, and the transmission apparatus may be configured to transmit data having different voltages to the reception apparatus for each of the transmission lines at a transmission time point corresponding to a voltage variation of data to be transmitted through each of the transmission lines.

Advantageous Effects of Invention

An internal interface apparatus of an electronic device of various embodiments and an operation method thereof may transmit data, using at least one transmission circuit corresponding to a voltage variation of data among multiple transmission circuits connected in parallel to each other, thereby implementing a uniform cross point of data transmission and reducing switching jitter.

An internal interface apparatus of an electronic device of various embodiments and an operation method thereof may adjust a transmission strength of data to correspond to a voltage variation of data, thereby implementing a uniform cross point of data transmission and reducing switching jitter.

An internal interface apparatus of an electronic device of various embodiments and an operation method thereof may adjust a transmission time point of data to correspond to a voltage variation of data, thereby implementing a uniform cross point of data transmission and reducing switching jitter.

BEST MODE FOR CARRYING OUT THE INVENTION

Figure 1:
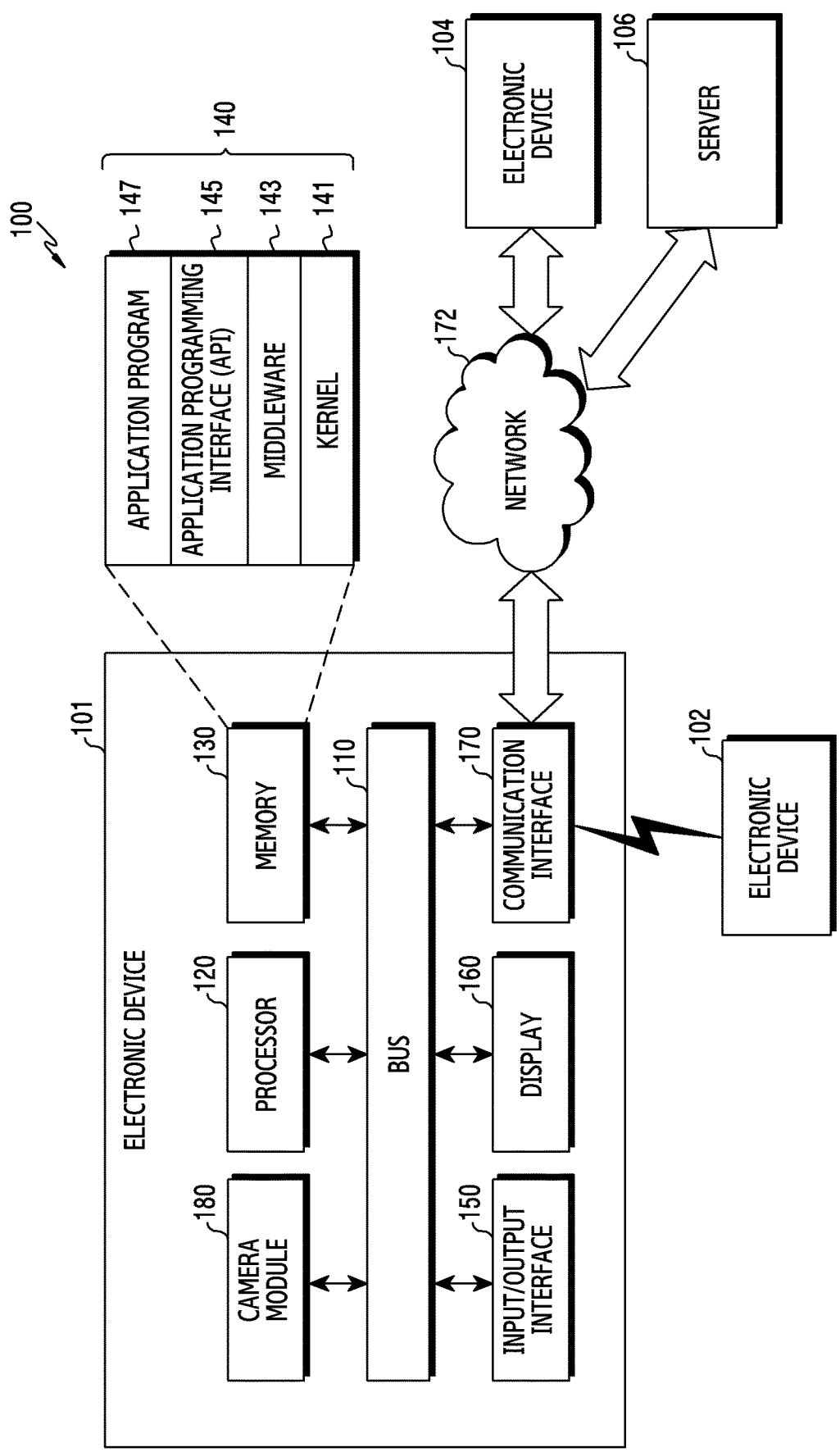
FIG. 1 illustrates an electronic device within a network environment in various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. Singular forms may include plural forms as well unless the context clearly indicates otherwise.

In the present disclosure, the expression "A or B", "at least one of A or/and B", or "one or more of A or/and B" may include all possible combinations of the items listed. The expression "a first", "a second", "the first", or "the second" used in various embodiments of the present disclosure may modify various components regardless of the order and/or the importance but does not limit the corresponding components. It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them.

The expression "configured to" used in the present disclosure may be exchanged with, for example, "suitable for", "having the capacity to", "designed to", "adapted to", "made to", or "capable of" according to the situation. In some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, or a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), or a bio-implantable circuit.

According to some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™ Apple TV™, or Google TV™), a game console (e.g., Xbox™ and PlayStation™), an electronic dictionary, an electronic key, a camcorder, or an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a global navigation satellite system (GNSS), an Event Data Recorder (EDR), a Flight Data Recorder (FDR), a Vehicle Infotainment Devices, an electronic devices for a ship (e.g., a navigation device for a ship, a gyro-compass, etc.), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). According to various embodiments, the electronic device may be a flexible device. According to various embodiments, the electronic device may be a combination of two or more of the aforementioned various devices. Further, the electronic device according to an embodiment of the present disclosure is not limited to the aforementioned devices. As used herein, the term "user" may indicate a person who uses an electronic device or a device (e.g., an artificial intelligence electronic device) that uses an electronic device.

FIG. 1 illustrates an electronic device 101 within a network environment 100 in various embodiments of the present disclosure.

Referring to FIG. 1, the electronic device 101 may include a bus 110, a processor 120, a memory 130, an input/output interface 150, a display 160, a communication interface 170, and a camera module 180. According to an embodiment, the electronic device 101 may omit at least one of the components or may further include other components.

The bus 110 may include, for example, a circuit which interconnects the components 120 to 180 and delivers a signal (e.g., a control message and/or data) between the components.

According to an embodiment, the bus 110 may include an interface of a C-PHY scheme of transmitting data between the components. For example, the bus 110 may transmit and/or receive data between the camera module 180 and the processor 120, using the interface of the C-PHY scheme. For example, the bus 110 may transmit and/or receive data between the processor 120 and the display 160, using the interface of the C-PHY scheme.

According to an embodiment, a transmission module of transmitting data through an interface of a C-PHY scheme may include three transmission lines. The transmission module may transmit data having different voltages through the respective transmission lines. For example, the transmission module may obtain a voltage pattern corresponding to 3-bit data for transmitting to a reception module, in a preset voltage table. The transmission module may transmit data having different voltages to the reception module through the respective transmission lines on the basis of the voltage pattern. For instance, the transmission module may transmit data having a ¼-voltage, a ½-voltage or a ¾-voltage to the reception module through each of the transmission lines.

According to an embodiment, the transmission module of the interface of the C-PHY scheme may include multiple transmission circuits connected in parallel to each other for transmitting data through each of the transmission lines. The transmission module may selectively use the multiple transmission circuits to correspond to a variation of a data voltage. For example, in response to the variation of the data voltage for transmitting to the reception module being zero or a first level, the transmission module may transmit data, using one transmission circuit. For example, in response to the variation of the data voltage for transmitting to the reception module being a second level, the transmission module may transmit data, using two transmission circuits. For example, in response to the variation of the data voltage for transmitting to the reception module being a third level, the transmission module may transmit data, using three transmission circuits. That is, the transmission module may control the number of the transmission circuits used for data transmission, to adjust a strength of power for data transmission. For instance, the variation of the data voltage may include a difference between a voltage of data transmitted to the reception module at a previous time point and a voltage of data to be transmitted to the reception module at a current time point. For instance, the variation of the data voltage of the first level may include a state in which a difference of the data voltage is one step like a voltage of data transmitted at a previous time point is a ¼ voltage and a voltage of data to be transmitted at a current time point is a ½ voltage. The variation of the data voltage of the second level may include a state in which a difference of the data voltage is two steps like the voltage of the data transmitted at the previous time point is a ¼ voltage and the voltage of the data to be transmitted at the current time point is a ¾ voltage, and in which data voltage variation has occurred at the previous time point. The variation of the data voltage of the third level may include a state in which a difference of the data voltage is two steps like the voltage of the data transmitted at the previous time point is a ¼ voltage and the voltage of the data to be transmitted at the current time point is a ¾ voltage, and in which data voltage variation has not occurred at the previous time point. Additionally or alternatively, the transmission module may be operatively connected with a control module for selectively managing the multiple transmission circuits to correspond to the variation of the data voltage. For instance, the control module may be configured to be included in the transmission module or be divided from the transmission module.

According to an embodiment, the transmission module of the interface of the C-PHY scheme may include a transmission circuit corresponding to each of the transmission lines. The transmission module may variably control a voltage of a corresponding transmission circuit to correspond to a variation of a data voltage. For example, in response to the variation of the data voltage for transmitting to the reception module being zero or a first level, the transmission module may set the voltage of the transmission circuit to one step. For example, in response to the variation of the data voltage for transmitting to the reception module being a second level, the transmission module may set the voltage of the transmission circuit to two steps. For example, in response to the variation of the data voltage for transmitting to the reception module being a third level, the transmission module may set the voltage of the transmission circuit to three steps. That is, the transmission module may control the voltage of the transmission circuit used for data transmission, to adjust a strength of a transmission power for transmitting data. For instance, the voltage of the transmission circuit may increase in proportion to a step. Additionally, or alternatively, the transmission module may identify the voltage of the transmission circuit to correspond to the variation of the data voltage on the basis of the control of the control module logically or physically divided from the transmission module.

According to an embodiment, the transmission module of the interface of the C-PHY scheme may include a transmission circuit corresponding to each of the transmission lines. The transmission module may control a transmission time point of data to correspond to a variation of a data voltage. For example, in response to the variation of the data voltage for transmitting to the reception module being zero or a first level, the transmission module may 2-step delay and transmit data to the reception module. For example, in response to the variation of the data voltage for transmitting to the reception module being a second level, the transmission module may 1-step delay and transmit data to the reception module. For example, in response to the variation of the data voltage for transmitting to the reception module being a third level, the transmission module may transmit data to the reception module without a delay. For instance, a delay time of data may increase in proportion to a step. Additionally or alternatively, the transmission module may include, or electrically connect to, the control module for controlling a transmission time point of data to correspond to the variation of the data voltage.

The processor 120 may include one or more of a Central Processing Unit (CPU), an Application Processor (AP), and a Communication Processor (CP). The processor 120 may carry out, for example, calculation or data processing relating to control and/or communication of at least one other component of the electronic device 101.

According to an embodiment, the processor 120 may control the transmission module of the interface of the C-PHY scheme connecting the components of the electronic device 101. For example, the processor 120 may adjust a strength of a transmission power of each of the transmission lines included in the transmission module corresponding to each of the components to correspond to a voltage variation of data. For example, the processor 120 may adjust a data transmission time point of each of the transmission lines included in the transmission module corresponding to each of the components to correspond to the voltage variation of the data.

The memory 130 may include a volatile memory and/or a non-volatile memory. The memory 130 may store, for example, commands or data relevant to at least one other component of the electronic device 101. According to an embodiment, the memory 130 may store software and/or a program 140. The program 140 may include, for example, a kernel 141, middleware 143, an Application Programming Interface (API) 145, or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130, and the like) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data. Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto. The API 145 is an interface through which the applications 147 control functions provided from the kernel 141 or the middleware 143, and may include, for example, at least one interface or function (e.g., instruction) for file control, window control, image processing, character control, and the like.

The input output interface 150 may, for example, play a role of an interface capable of forwarding a command or data inputted from a user or another external device, to another component(s) of the electronic device 101.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (e.g., text, images, videos, icons, or symbols) to users.

According to an embodiment, the display 160 may include a touch panel and a pressure panel. The display 160 and may receive, for example, a touch, gesture, proximity, or hovering input using an electronic pen or a user's body part through the touch panel. The display 160 and may receive, for example, a pressure input of part of the human body of a user or a nonconductor, through the pressure panel.

The communication interface 170 may establish communication, for example, between the electronic device 101 and an external device (e.g., a first external electronic device 102, a second external electronic device 104, or a server 106). For example, the communication interface 170 may be connected to a network 172 through wireless or wired communication, and may communicate with an external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), or Global System for Mobile Communications (GSM), as a cellular communication protocol. In addition, the wireless communication may include, for example, short range communication 164. According to an embodiment, the wireless communication may include at least one of, for example, wireless fidelity (Wi-Fi), light fidelity (Li-Fi), Bluetooth, Bluetooth low energy (BLE), Zigbee, Near Field Communication (NFC), magnetic secure transmission, Radio Frequency (RF), or body area network (BAN). According to an embodiment, the wireless communication may include Global Navigation Satellite System (GNSS). GNSS may include, for example, at least one of global positioning system (GPS), global navigation satellite system (Glonass), Beidou Navigation satellite system (Beidou) or the European global satellite-based navigation system (Galileo). Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a power line communication or a Plain Old Telephone Service (POTS). The network 172 may include at least one of a telecommunication network such as a computer network (e.g., a LAN or a WAN), the Internet, or a telephone network.

Each of the first and second external electronic devices 102 and 104 may be of a type identical to or different from that of the electronic device 101. According to various embodiments, all or some of the operations performed in the electronic device 101 may be executed in another electronic device or a plurality of electronic devices (e.g., the electronic devices 102 and 104 or the server 106). According to an embodiment, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

The camera module 180 may collect image information about a subject. For example, the camera module 180 may include multiple camera modules included in the electronic device 101. For instance, the camera module 180 may include a first camera module (e.g., front camera device) for photographing in a self mode and a second camera module (e.g., rear camera device) for photographing a subject located in front of a user. For instance, the camera module 180 may include an image sensor such as a charge-coupled device (CCD) sensor, a complementary metal-oxide semiconductor (CMOS) sensor or the like.

Figure 2:
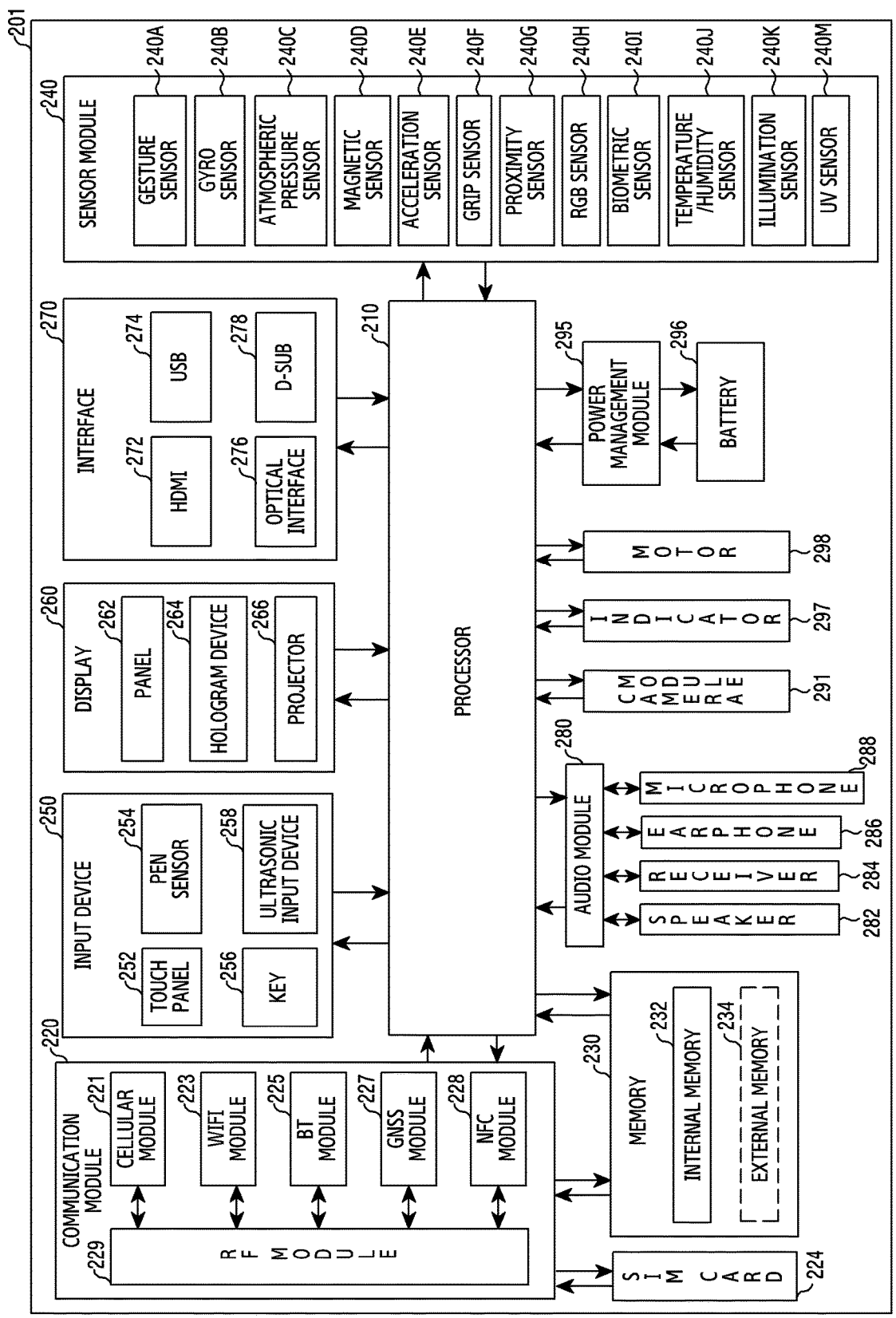
FIG. 2 illustrates a block diagram of an electronic device of various embodiments of the present disclosure.

FIG. 2 illustrates a block diagram of an electronic device 201 according to various embodiments. The electronic device 201 may include, for example, all or a part of the electronic device 101 shown in FIG. 1. The electronic device 201 may include one or more processors 210 (e.g., Application Processors (AP)), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor (ISP). The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store result data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227, an NFC module 228, and a Radio Frequency (RF) module 229.

The cellular module 221, for example, may provide a voice call, a video call, a text message service, or an Internet service through a communication network. According to an embodiment, the cellular module 221 may distinguish and authenticate the electronic device 201 in a communication network using a subscriber identification module (e.g: SIM card) 224. According to an embodiment, the cellular module 221 may perform at least some of the functions that the processor 210 may provide. According to an embodiment, the cellular module 221 may include a communication processor (CP).

According to an embodiment, at least some (e.g., two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), or an antenna. According to another embodiment, at least one of the cellular module 221, the WIFI module 223, the BT module 225, the GNSS module 227, or the NFC module 228 may transmit/receive an RF signal through a separate RF module. The subscriber identification module 224 may include, for example, a card including a subscriber identity module or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130 of FIG. 1) may include, for example, an embedded memory 232 or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like). The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction (a touch coordinate) to the user. the (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. According to an embodiment, the panel 262 may include a pressure sensor (or a force sensor) capable of measuring pressure information (e.g., a pressure coordinate, and a pressure intensity) to a touch of a user. The pressure sensor may be implemented integrally with the touch panel 252, or one or more sensors separately with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. The interface 270 may include, for example, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288. The camera module 291 is, for example, a device which may photograph a still image and a video. According to an embodiment of the present disclosure, the camera module 291 may include one or more image sensors (e.g., a front sensor or a back sensor), a lens, an Image Signal Processor (ISP) or a flash (e.g., LED or xenon lamp). The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process, for example, media data according to a certain standard such as Digital Multimedia Broadcasting (DMB), Digital Video Broadcasting (DVB), or mediaFLO™. Each of the above-described component elements of hardware according to the present disclosure may be configured with one or more components, and the names of the corresponding component elements may vary based on the type of electronic device. In various embodiments, the electronic device (e.g., the electronic device 201) may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
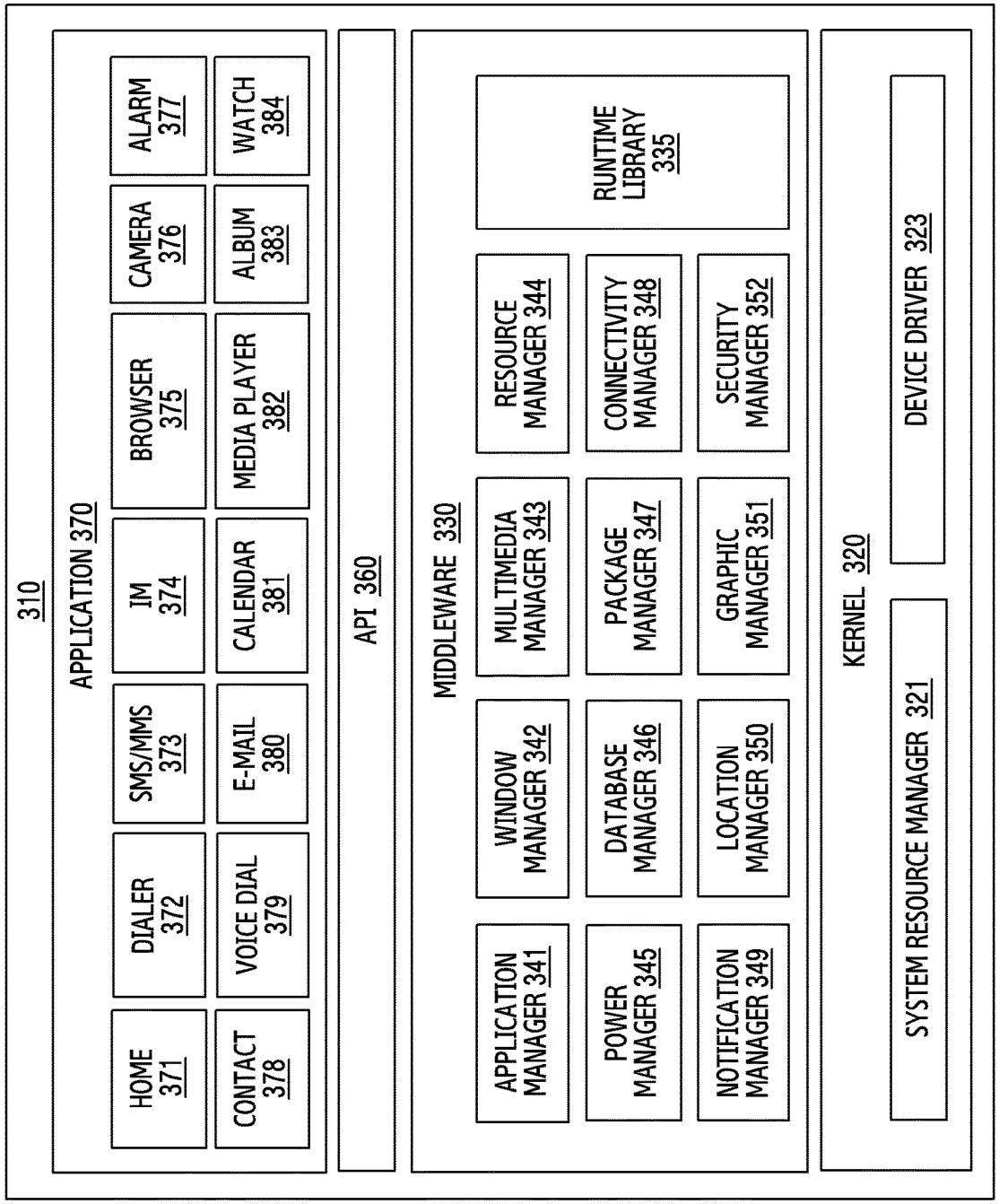
FIG. 3 illustrates a block diagram of a program module of various embodiments of the present disclosure.

FIG. 3 illustrates a block diagram of a program module according to various embodiments. According to an embodiment, the program module 310 (e.g., the program 140 of FIG. 1) may include an Operating System (OS) for controlling resources related to the electronic device (e.g., the electronic device 101 of FIG. 1) and/or various applications (e.g., the application programs 147 of FIG. 1) executed in the operating system. The operating system may be, for example, Android™, iOS™, Windows™, Symbian™, Tizen™, or Bada™.

Referring to FIG. 3, the program module 310 may include a kernel 320 (e.g., the kernel 141 of FIG. 1), middleware 330 (e.g., the middleware 143 of FIG. 1), an API 360 (e.g., the API 145 of FIG. 1), and/or applications 370 (e.g., the application program 147 of FIG. 1). At least some of the program module 310 may be preloaded on an electronic device, or may be downloaded from an external electronic device (e.g., the electronic device 102 or 104, or the server 106 of FIG. 1).

The kernel 320 may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, a touch device driver, a pressure device driver or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like. The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370. The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

The connectivity manager 348 may manage, for example, wireless connectivity. The notification manager 349 may display or notify of an event such as an arrival message, promise, proximity notification, and the like. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment, the middleware 330 may include a telephony manager for managing a voice call function or a video call function of the electronic device. The middleware 330 may include a middleware module that forms a combination of various functions of the above-described components. According to an embodiment, the middleware 330 may provide a module specialized for each type of OS. Further, the middleware 330 may dynamically remove some of the existing components or add new components. The API 360 is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information). According to an embodiment of the present disclosure, the applications 370 may include an information exchange application that supports exchanging information between the electronic device and an external electronic device. The information exchange application may include, for example, a notification relay application for transferring specific information to an external electronic device or a device management application for managing an external electronic device. The notification relay application may deliver notification information generated from another application of the electronic device to an external electronic device. The notification relay application may receive notification information from, for example, the external electronic device and provide the received notification information to a user. The device management application may install, delete, or update, for example, a function of an external electronic device communicating with the electronic device (e.g., a function of turning on/off the external electronic device itself (or some components) or a function of adjusting the brightness (or a resolution) of the display), applications operating in the external electronic device. According to an embodiment, the applications 370 may include applications (e.g., a health care application of a mobile medical appliance or the like) designated according to attributes of the external electronic device). According to an embodiment, the applications 370 may include an application received from an external electronic device. At least a part of the programming module 310 may be implemented (e.g., executed) in software, firmware, hardware (e.g., the processor 210), or a combination of two or more thereof. At least some of the program module 310 may include, for example, a module, a program, a routine, a set of instructions, or a process for performing one or more functions.

Figure 4A:
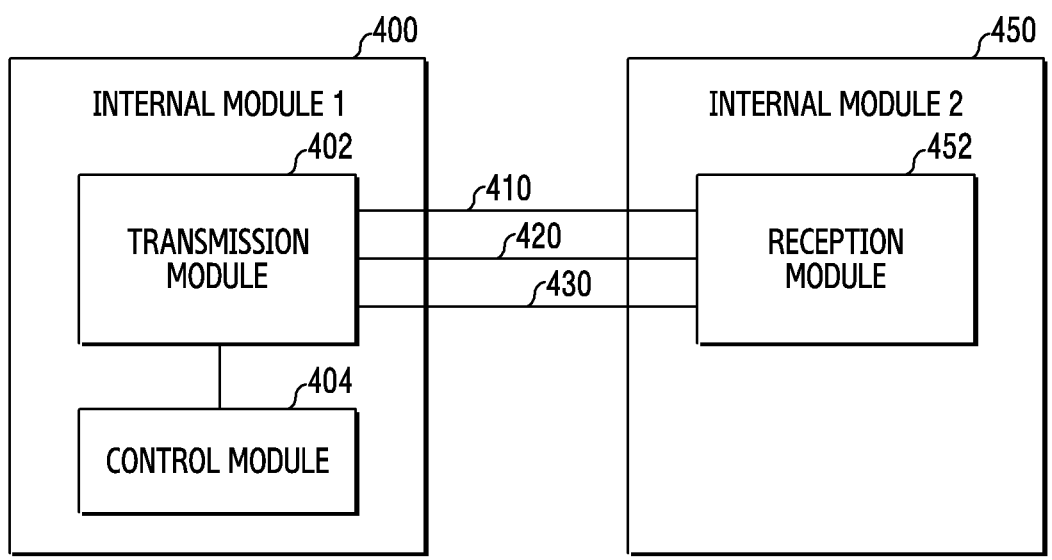
FIG. 4A illustrates a structure of connection of internal modules of various embodiments of the present disclosure.

FIG. 4A illustrates a structure of connection of internal modules of various embodiments of the present disclosure. In the following description, the internal module 1 400 and the internal module 2 450 may include at least some of the components 120 to 180 of the electronic device 101 illustrated in FIG. 1.

Referring to FIG. 4A, the internal module 1 400 may transmit data of 3 bits per clock to the internal module 2 450 through a digital interface of a C-PHY scheme.

According to an embodiment, the internal module 1 400 may include a transmission module 402 and a control module 404. For example, the control module 404 may control data transmission of the transmission module 402 to reduce switching jitter. The switching jitter may occur due to voltage variation of data for transmitting from the transmission module 402 to the internal module 2 450 through each transmission line 410, 420 or 430. For instance, the control module 404 may control the transmission module 402 to adjust the number of transmission circuits to be used for transmitting data through each transmission line 410, 420 or 430, on the basis of a voltage variation of data for transmitting to the internal module 2 450 through each transmission line 410, 420 or 430. For instance, the control module 404 may control the transmission module 402 to adjust a voltage of a transmission circuit corresponding to each transmission line 410, 420 or 430 on the basis of a voltage variation of data for transmitting to the internal module 2 450 through each transmission line 410, 420 or 430. For instance, the control module 404 may control the transmission module 402 to adjust a data transmission time point for each transmission line 410, 420 or 430 on the basis of the voltage variation of the data for transmitting to the internal module 2 450 through each transmission line 410, 420 or 430.

According to an embodiment, the transmission module 402 may transmit data having different voltages to the internal module 2 450 at the same time point (e.g., clock) through three transmission lines 410, 420 and 430 on the basis of the control of the control module 404.

According to an embodiment, the internal module 2 450 may include a reception module 452 receiving data having different voltages from the transmission module 402 of the internal module 1 400 through each transmission line 410, 420 or 430, to obtain 3-bit data.

According to various embodiments of the present disclosure, the transmission module 402 may include the control module 404 controlling data transmission of the transmission module 402 as well.

Figure 4B:
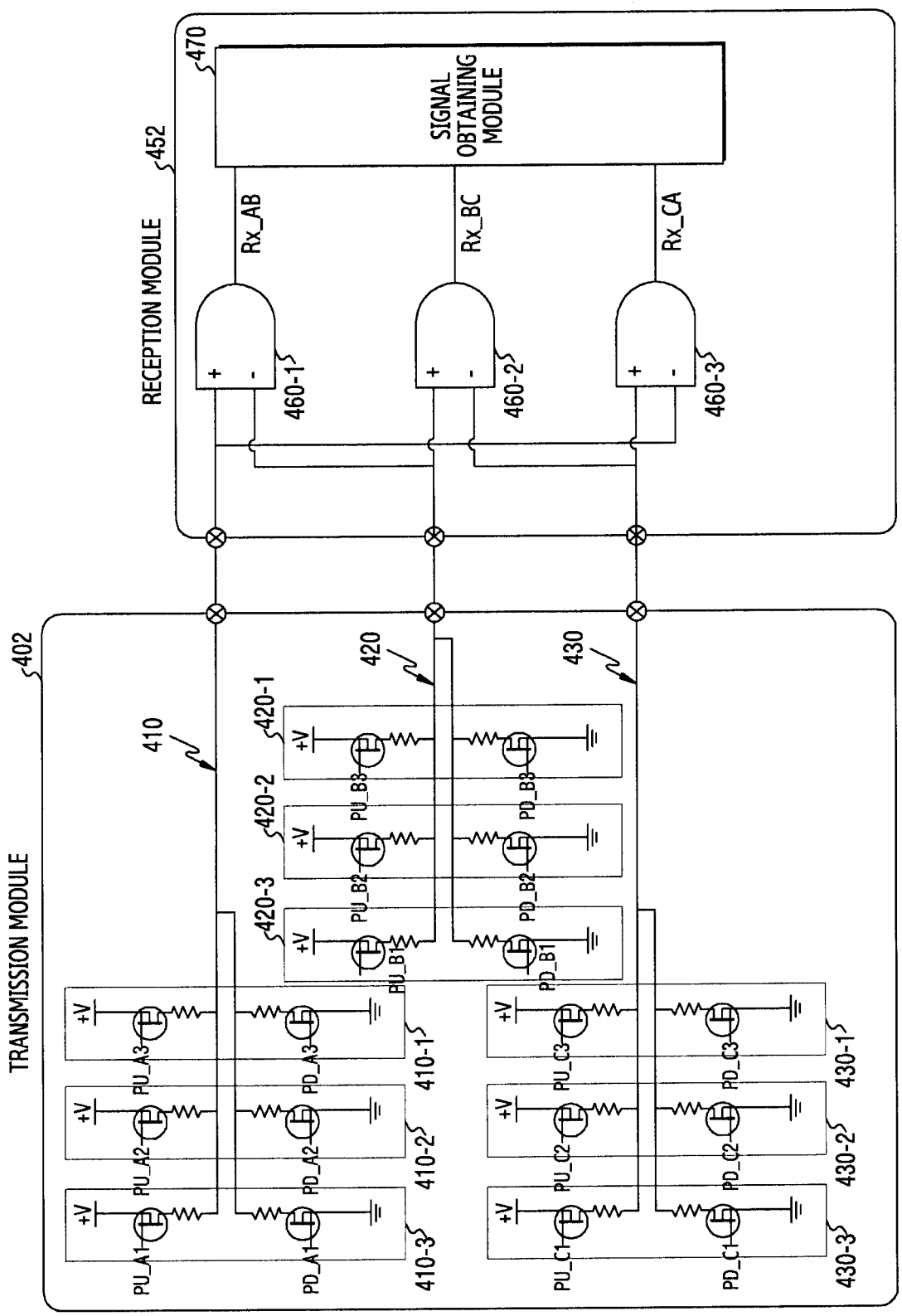
FIG. 4B illustrates a block diagram of an internal interface of an electronic device of various embodiments of the present disclosure.
Figure 5:
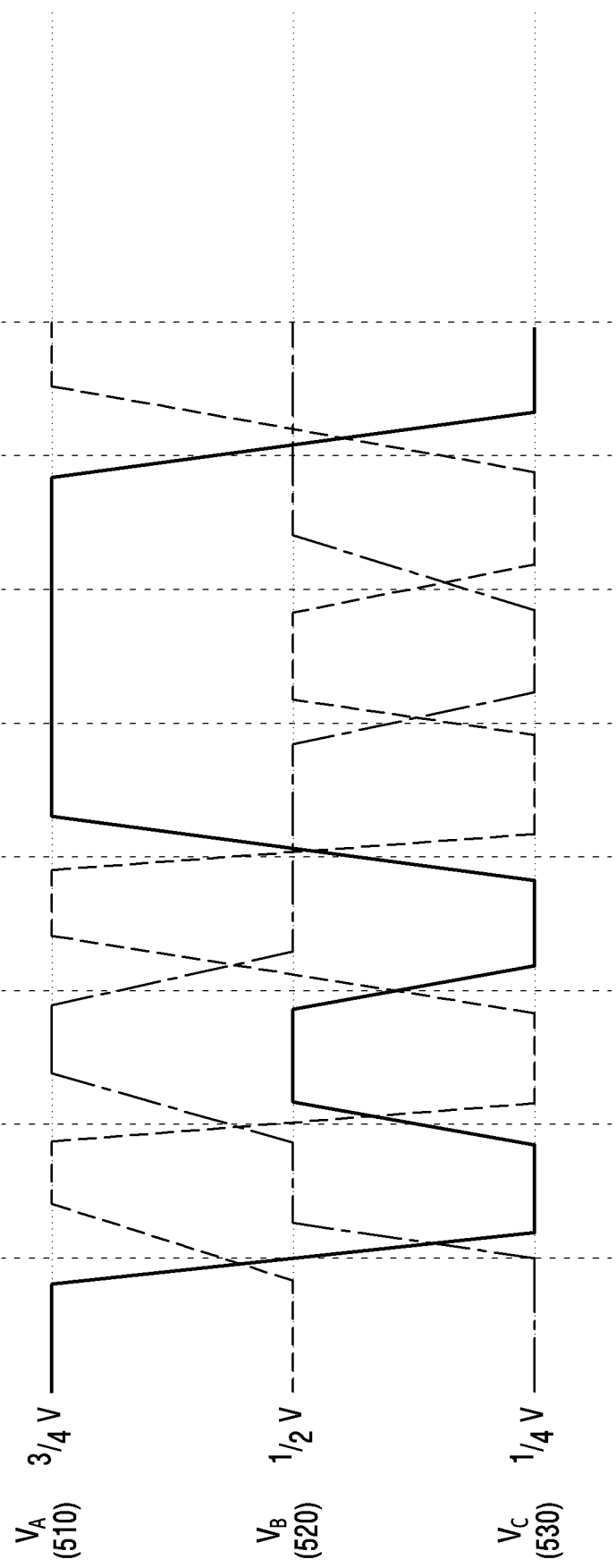
FIG. 5 illustrates a conceptual diagram for transmitting data in a transmission module of various embodiments of the present disclosure.
Figure 6A:
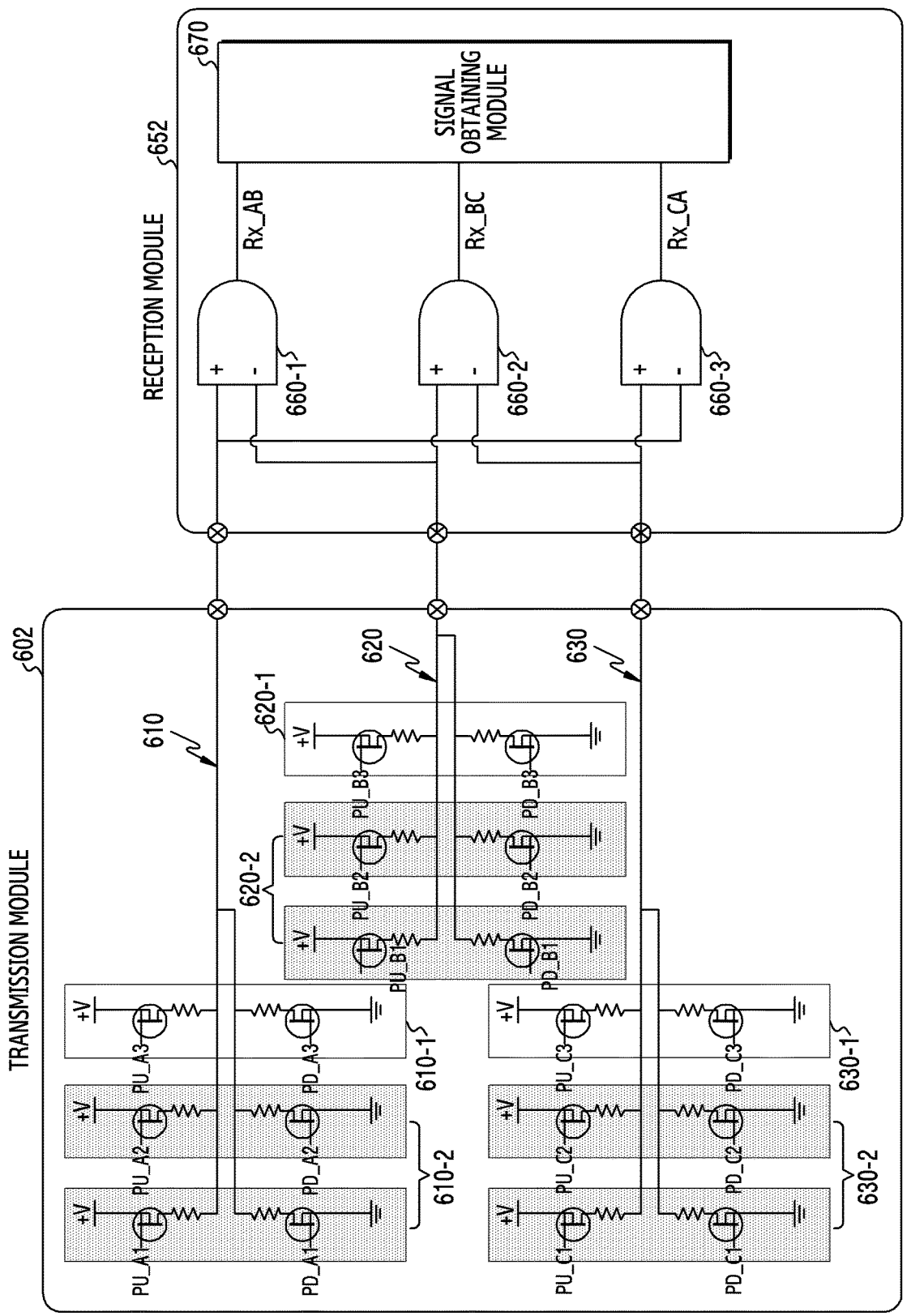
FIG. 6A to FIG. 6E illustrate block diagrams for transmitting data on the basis of a voltage variation in an internal interface of various embodiments of the present disclosure.
Figure 6B:
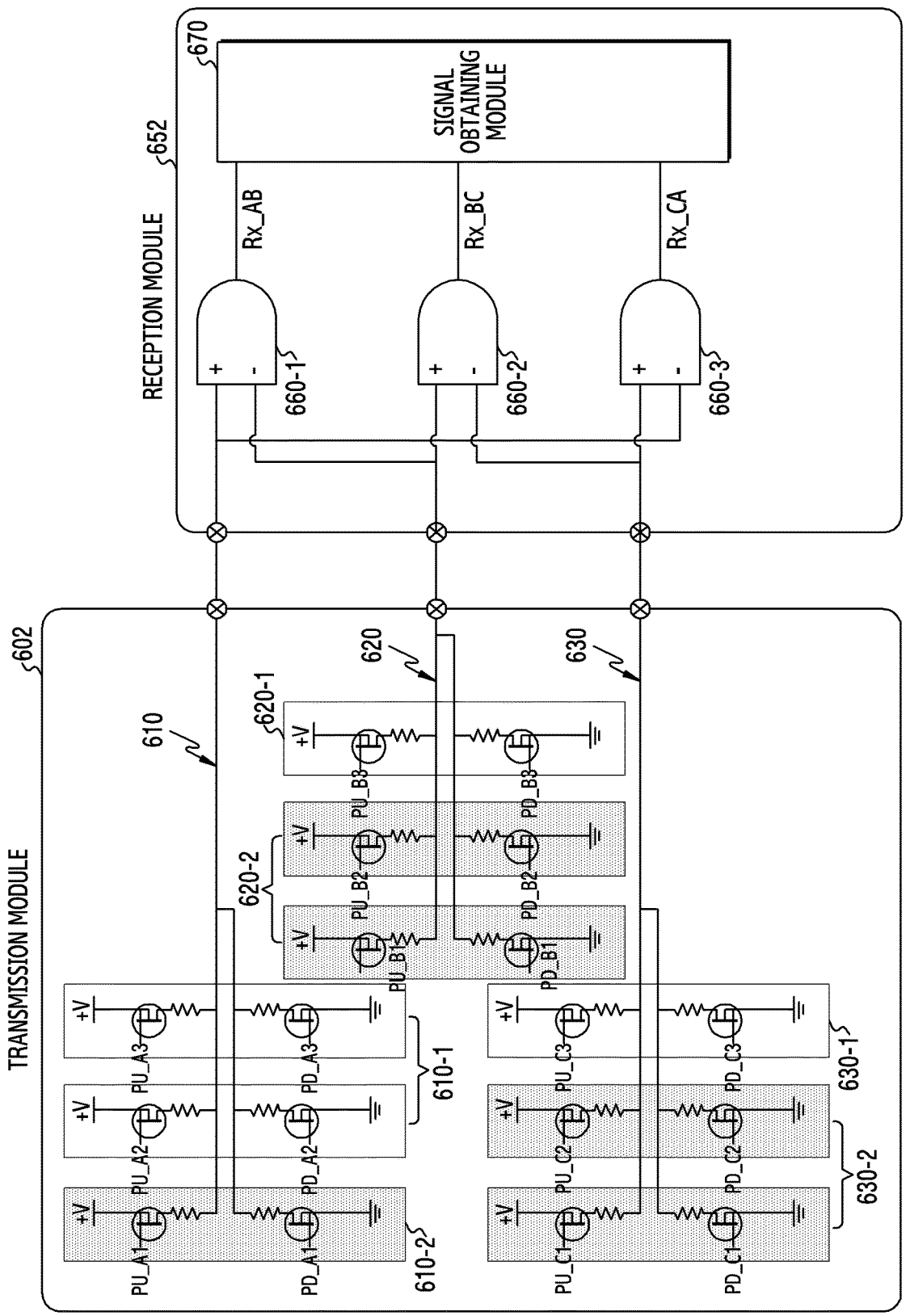
Figure 6C:
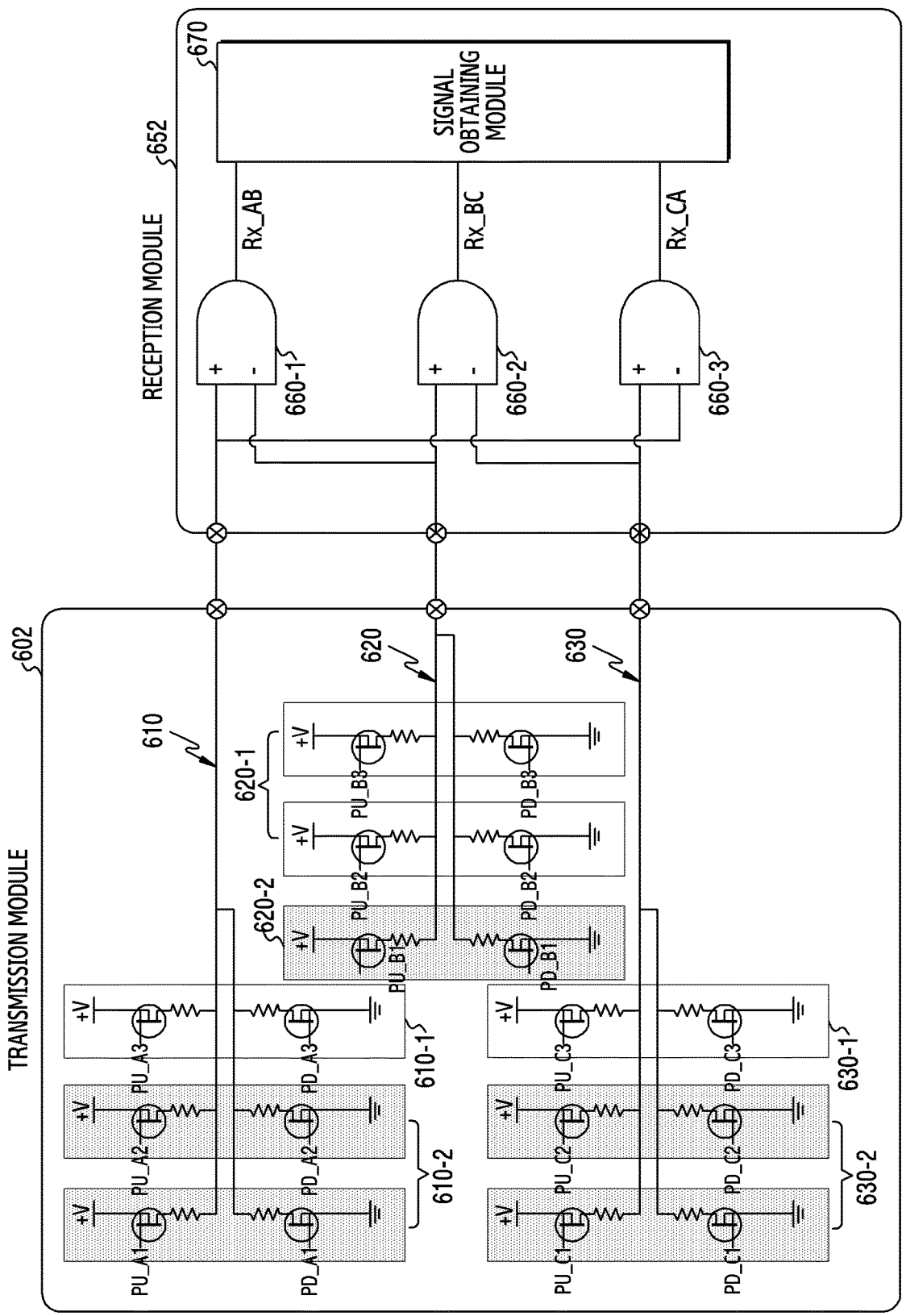
Figure 6D:
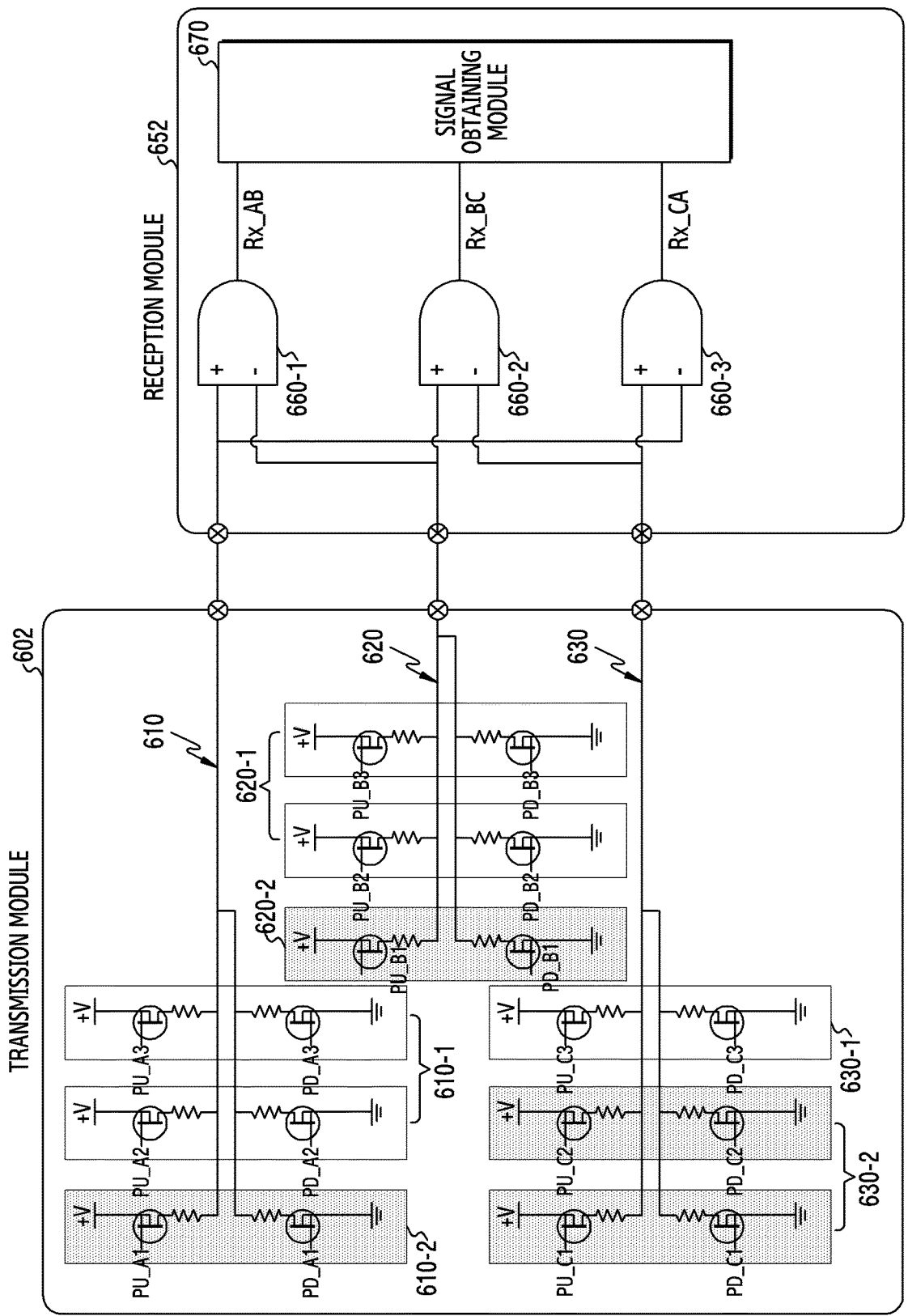
Figure 6E:
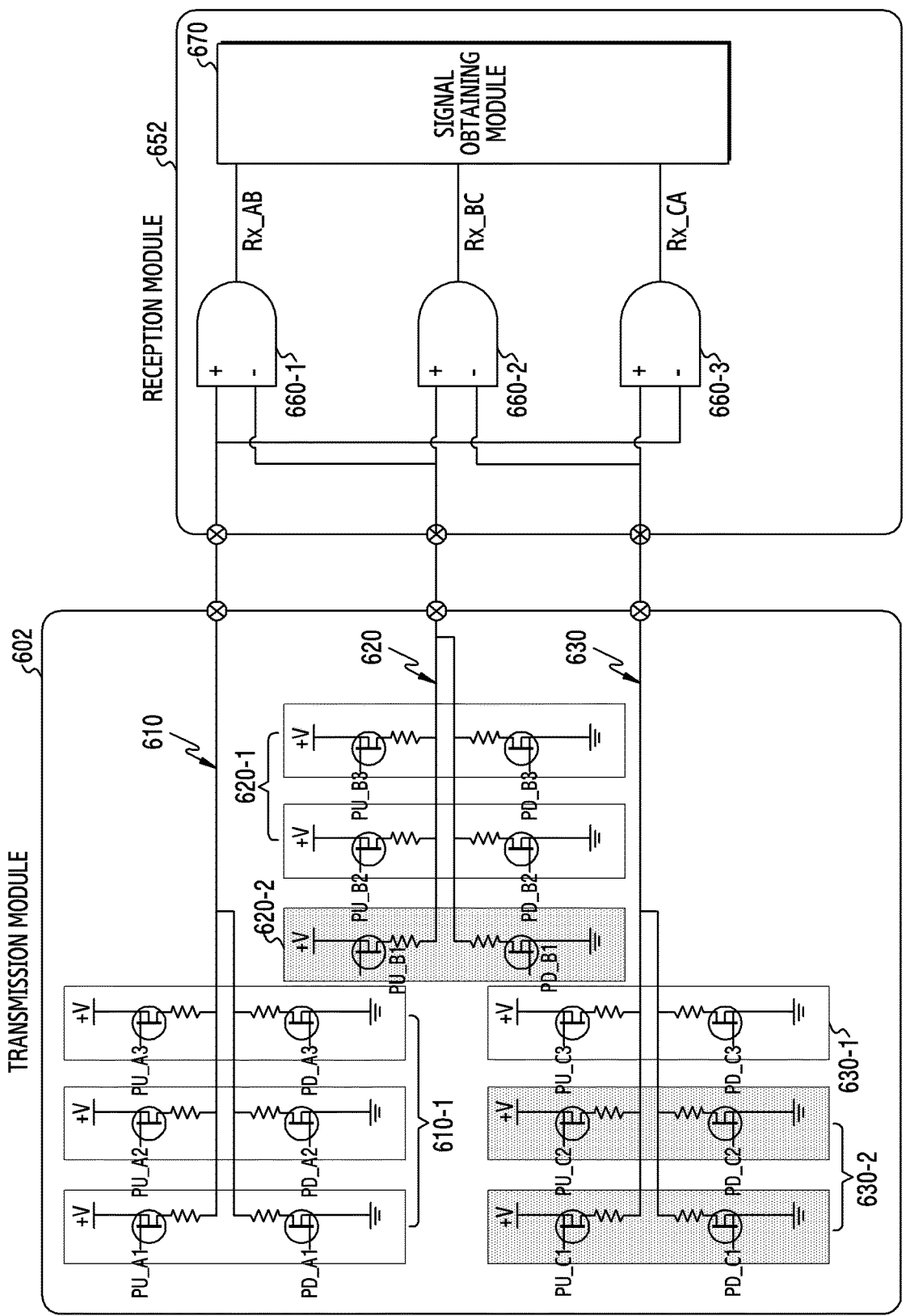
Figure 7:
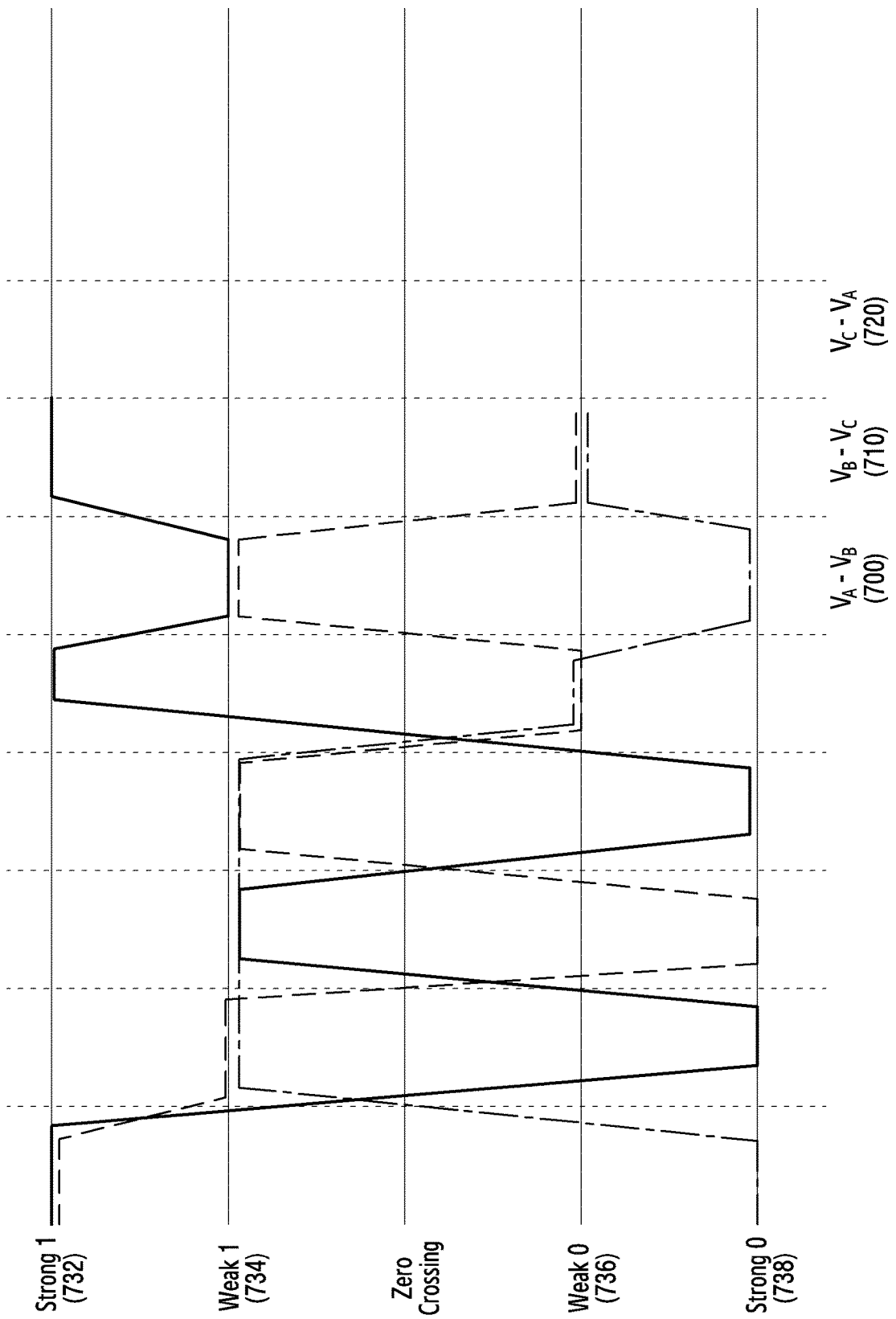
FIG. 7 illustrates a conceptual diagram for receiving data in a reception module of various embodiments of the present disclosure.

FIG. 4B illustrates a block diagram of an internal interface of an electronic device of various embodiments of the present disclosure. FIG. 5 illustrates a conceptual diagram for transmitting data in a transmission module of various embodiments of the present disclosure. FIG. 7 illustrates a conceptual diagram for receiving data in a reception module of various embodiments of the present disclosure.

According to an embodiment, the transmission module 402 may include multiple transmission circuits 410-1 to 410-3, 420-1 to 420-3, and 430-1 to 430-3 for transmitting data through each transmission line 410, 420 or 430. For example, the transmission module 402 may transmit data having a first voltage to the reception module 452 through the first transmission line 410, using three transmission circuits 410-1, 410-2 and 410-3 connected in parallel to each other. For example, the transmission module 402 may transmit data having a second voltage to the reception module 452 through the second transmission line 420, using three transmission circuits 420-1, 420-2 and 420-3 connected in parallel to each other. For example, the transmission module 402 may transmit data having a third voltage to the reception module 452 through the third transmission line 430, using three transmission circuits 430-1, 430-2 and 430-3 connected in parallel to each other. In detail, as in FIG. 5, the transmission module 402 may transmit data having different voltages to the reception module 452 through the respective transmission lines 510, 520 and 530. For instance, a voltage transmitted from the transmission module 402 through each of the transmission lines 510, 520 and 530 may be shown as in <Table 1> below.

TABLE 1

| | wire amplitude | | |
|---|---|---|---|
| wire state | A (the first transmission line) | B (the second transmission line) | C (the third transmission line) |
| first time point | ¾ V | ½ V | ¼ V |
| second time point | ¼ V | ¾ V | ½ V |
| third time point | ½ V | ¼ V | ¾ V |
| fourth time point | ¼ V | ¾ V | ½ V |
| fifth time point | ¾ V | ¼ V | ½ V |
| sixth time point | ¾ V | ½ V | ¼ V |
| seventh time point | ¾ V | ¼ V | ½ V |
| eighth time point | ¼ V | ¾ V | ½ V |

According to an embodiment, the transmission module 402 may adjust the number of transmission circuits to be used for transmitting data through each transmission line 410, 420 or 430 to correspond to a voltage variation of data to be transmitted to the reception module 452 through each transmission line 410, 420 or 430. For example, the transmission module 402 may transmit data, using transmission circuits of a relatively great number as the voltage variation of the data is large.

According to an embodiment, each of the transmission circuits may include a pull up device for increasing a voltage of data and a pull down device for decreasing a voltage of data. For instance, the pull up device and the pull down device may each include at least one transistor and at least one resistor connected in series with the transistor.

According to an embodiment, the reception module 452 may include three subtracters 460-1 to 460-3 and a signal obtaining module 470 in order to receive data through an interface of a C-PHY scheme. For example, the first subtracter 460-1 may obtain a difference of a voltage of data received through the second transmission line 420 with a criterion of a voltage of data received through the first transmission line 410. The second subtracter 460-2 may obtain a difference of a voltage of data received through the third transmission line 430 with a criterion of a voltage of data received through the second transmission line 420. The third subtracter 460-3 may obtain a difference of a voltage of data received through the first transmission line 410 with a criterion of a voltage of data received through the third transmission line 430. In detail, as in FIG. 7, the reception module 452 may calculate a voltage difference 732, 734, 736 or 738 of data received through each of the transmission lines 410, 420 and 430. For instance, a voltage difference of data calculated using the subtracter 460-1, 460-2 or 460-3 of the reception module 452 may be shown as in <Table 2> below. For instance, in FIG. 7, strong 1 may correspond to a data voltage difference of ½ V, and weak 1 may correspond to a data voltage difference of ¼ V. Strong 0 may correspond to a data voltage difference of −½ V, and weak 0 may correspond to a data voltage difference of −¼ V.

TABLE 2

| | receiver diff input voltage | | |
|---|---|---|---|
| wire state | A − B | B − C | C − A |
| first time point | ½ V | ½ V | −½ V |
| second time point | −½ V | ¼ V | ¼ V |
| third time point | ¼ V | −½ V | ¼ V |
| fourth time point | −½ V | ¼ V | ¼ V |
| fifth time point | ½ V | −¼ V | −¼ V |
| sixth time point | ¼ V | ¼ V | −½ V |
| seventh time point | ½ V | −¼ V | −¼ V |
| eighth time point | −½ V | ½ V | ¼ V |

According to an embodiment, the signal obtaining module 470 may obtain data corresponding to a voltage difference of data which is obtained through each subtracter 460-1, 460-2 or 460-3. For example, in response to a voltage difference of data being a positive number, the signal obtaining module 470 may identify that a bit of data received through a corresponding subtracter is equal to 1. In response to the voltage difference of the data being a negative number, the signal obtaining module 470 may identify that a bit of data received through a corresponding subtracter is equal to 0. In detail, the signal obtaining module 470 may obtain data of <Table 3> on the basis of the data voltage difference of <Table 2>.

TABLE 3

| | receiver digital output | | |
|---|---|---|---|
| wire state | Rx_AB | Rx_BC | Rx_CA |
| first time point | 1 | 1 | 0 |
| second time point | 0 | 1 | 1 |
| third time point | 1 | 0 | 1 |
| fourth time point | 0 | 1 | 1 |
| fifth time point | 1 | 0 | 0 |
| sixth time point | 1 | 1 | 0 |
| seventh time point | 1 | 0 | 0 |
| eighth time point | 0 | 1 | 1 |

FIG. 6A to FIG. 6E illustrate block diagrams for transmitting data on the basis of a voltage variation in an internal interface of various embodiments of the present disclosure.

The following description is made for a construction of a transmission circuit for transmitting data through each transmission line 610, 620 or 630 to correspond to voltage variation of data of FIG. 5 in a transmission module 602. In the following description, the transmission module 602 may include the whole or part of the transmission module 402 of FIG. 4B.

Referring to FIG. 6A to FIG. 6E, the transmission module 602 may adjust the number of transmission circuits to be used for transmitting data through each transmission line 610, 620 or 630 to correspond to a voltage variation of data. In this case, the transmission module 602 may adjust a transmission power strength of data transmitted through each transmission line 610, 620 or 630 of data to correspond to the number of transmission circuits to be used for transmitting data through each transmission line 610, 620 or 630. The transmission module 602 may adjust a rise time and fall time of data transmitted through each transmission line 610, 620 or 630 as adjusting the transmission power strength for each transmission line 610, 620 or 630.

According to an embodiment, in response to initially transmitting data (the first time point of FIG. 5), the transmission module 602 may identify that voltage variation of data does not occur. According to this, as in FIG. 6A, the transmission module 602 may transmit data through each transmission line 610, 620 or 630, using one transmission circuit 610-1, 620-1 or 630-1. For instance, the transmission module 602 may switch the transmission circuits 610-2, 620-2 and 630-2 not used by the respective transmission lines 610, 620 and 630, into an inactive state.

According to an embodiment, in response to the second time point of FIG. 5, data to be transmitted through the first transmission line 610 may have a voltage variation of a second level, and data to be transmitted through the second transmission line 620 and the third transmission line 630 may have a voltage variation of a first level. In this case, as in FIG. 6B, the transmission module 602 may transmit data through the first transmission line 610, using two transmission circuits 610-1. The transmission module 602 may transmit data through the second transmission line 620 or the third transmission line 630, using one transmission circuit 620-1 or 630-1. For instance, the transmission module 602 may switch the transmission circuits 610-2, 620-2 and 630-2 not used by the respective transmission lines 610, 620 and 630, into an inactive state.

According to an embodiment, in response to the third time point or fourth time point of FIG. 5, data to be transmitted through the second transmission line 620 may have a voltage variation of a second level, and data to be transmitted through the first transmission line 610 and the third transmission line 630 may have a voltage variation of a first level. In this case, as in FIG. 6C, the transmission module 602 may transmit data through the second transmission line 620, using two transmission circuits 620-1. The transmission module 602 may transmit data through the first transmission line 610 or the third transmission line 630, using one transmission circuit 610-1 or 630-1. For instance, the transmission module 602 may switch the transmission circuits 610-2, 620-2 and 630-2 not used by the respective transmission lines 610, 620 and 630, into an inactive state.

According to an embodiment, in response to the fifth time point of FIG. 5, data to be transmitted through the first transmission line 610 and the second transmission line 620 may have a voltage variation of a second level, and data to be transmitted through the third transmission line 630 may not have voltage variation. In this case, as in FIG. 6D, the transmission module 602 may transmit data through the first transmission line 610 or the second transmission line 620, using two transmission circuits 610-1 or 620-1. The transmission module 602 may transmit data through the third transmission line 630, using one transmission circuit 630-1. For instance, the transmission module 602 may switch the transmission circuits 610-2, 620-2 and 630-2 not used by the respective transmission lines 610, 620 and 630, into an inactive state.

According to an embodiment, in response to the sixth time point or seventh time point of FIG. 5, data to be transmitted through the second transmission line 620 and the third transmission line 630 may have a voltage variation of a first level, and data to be transmitted through the first transmission line 610 may not have voltage variation. In this case, as in FIG. 6A, the transmission module 602 may transmit data through each of the transmission lines 610, 620 and 630, using one transmission circuit 610-1, 620-1 or 630-1. For instance, the transmission module 602 may switch the transmission circuits 610-2, 620-2 and 630-2 not used by the respective transmission lines 610, 620 and 630, into an inactive state.

According to an embodiment, in response to the eighth time point of FIG. 5, data to be transmitted through the first transmission line 610 may have a voltage variation of a third level, and data to be transmitted through the second transmission line 620 may have a voltage variation of a second level, and data to be transmitted through the third transmission line 630 may not have voltage variation. In this case, as in FIG. 6E, the transmission module 602 may transmit data through the first transmission line 610, using three transmission circuits 610-1. The transmission module 602 may transmit data through the second transmission line 620, using two transmission circuits 620-1. The transmission module 602 may transmit data through the third transmission line 630, using one transmission circuit 630-1. For instance, the transmission module 602 may switch the transmission circuits 620-2 and 630-2 not used by the respective transmission lines 620 and 630, into an inactive state.

Figure 8:
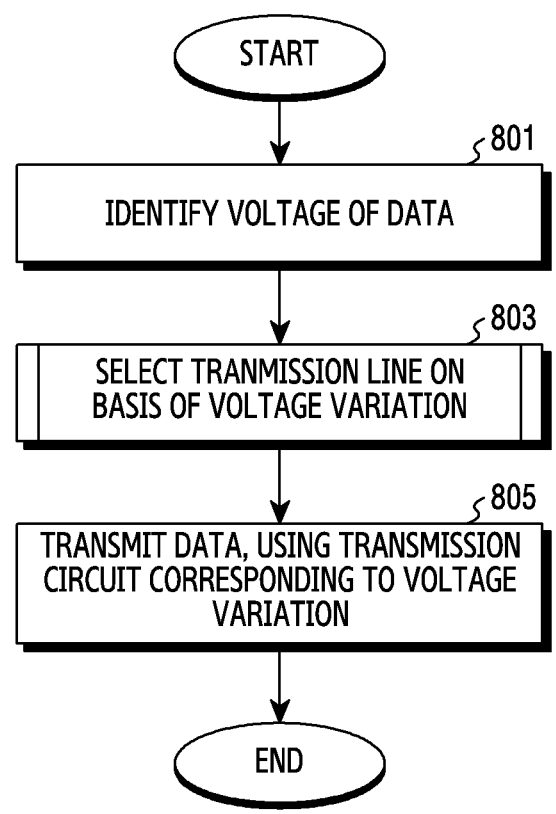
FIG. 8 illustrates a flowchart for transmitting data, using a transmission circuit corresponding to a voltage variation in a transmission module of various embodiments of the present disclosure.

FIG. 8 illustrates a flowchart for transmitting data, using a transmission circuit corresponding to a voltage variation in a transmission module of various embodiments of the present disclosure. In the following description, the transmission module may include the whole or part of the transmission module 402 of FIG. 4B or the transmission module 602 of FIG. 6A to FIG. 6E.

Referring to FIG. 8, in operation 801, the transmission module may identify a voltage of data for transmitting to a reception module through each of transmission lines. For example, in response to being included in the camera module 180, the transmission module 602 may identify bit data for transmitting to the processor 120 (e.g., the reception module 652) through three transmission lines 610, 620 and 630 at a current clock, among image data obtained through the camera module 180. The transmission module 602 may obtain a voltage pattern corresponding to the bit data for transmitting to the processor 120, in a predefined voltage table. The transmission module 602 may identify a voltage of data to be transmitted to the reception module 652 through each of the transmission lines, on the basis of the voltage pattern corresponding to the bit data for transmitting to the processor 120.

In operation 803, the transmission module may select a transmission circuit for each of the transmission lines to be used for transmitting data to the reception module, on the basis of a voltage variation of corresponding data for each of the transmission lines. For example, the transmission module 602 (or the control module 404) may identify the number of transmission circuits to be used for transmitting data, in proportion to a voltage variation of data. In detail, in response to a voltage variation of data for transmitting to the reception module being zero or a first level, the transmission module 602 may select one transmission circuit 630-1 like the third transmission line 630 of FIG. 6E. In response to the voltage variation of the data being a second level, the transmission module 602 may select two transmission circuits 620-1 like the second transmission line 620 of FIG. 6E. In response to the voltage variation of the data being a third level, the transmission module 602 may select three transmission circuits 610-1 like the first transmission line 610 of FIG. 6E. Additionally or alternatively, the transmission module 602 may switch the remaining transmission circuits not selected as the transmission circuits for data transmission in each transmission line 610, 620 or 630, into an inactive state. For instance, the voltage variation of the data may be identified by a difference of a voltage of data to be transmitted to the reception module 652 at a current time point with a criterion of a voltage of data transmitted to the reception module 652 at a previous time point (clock) through a corresponding transmission line.

In operation 805, the transmission module may transmit data to the reception module through the transmission circuit corresponding to the voltage variation of the data. For example, in response to the first transmission line 610 of FIG. 6E, the transmission module 602 may transmit data having a first voltage identified in operation 801 to the reception module 652, using three transmission circuits 610-1. In response to the second transmission line 620 of FIG. 6E, the transmission module 602 may transmit data having a second voltage identified in operation 801 to the reception module 652, using two transmission circuits 620-1. In response to the third transmission line 630 of FIG. 6E, the transmission module 602 may transmit data having a third voltage identified in operation 801 to the reception module 652, using one transmission circuit 630-1.

According to various embodiments of the present disclosure, the transmission module 602 may identify the number of transmission circuits to be used for transmitting data through a transmission line to correspond to a voltage variation of data to be transmitted to the reception module 652 through the transmission line, thereby reducing switching jitter of a digital interface. According to this, the digital interface may secure an optimal eye mask during signal transmission.

Figure 9:
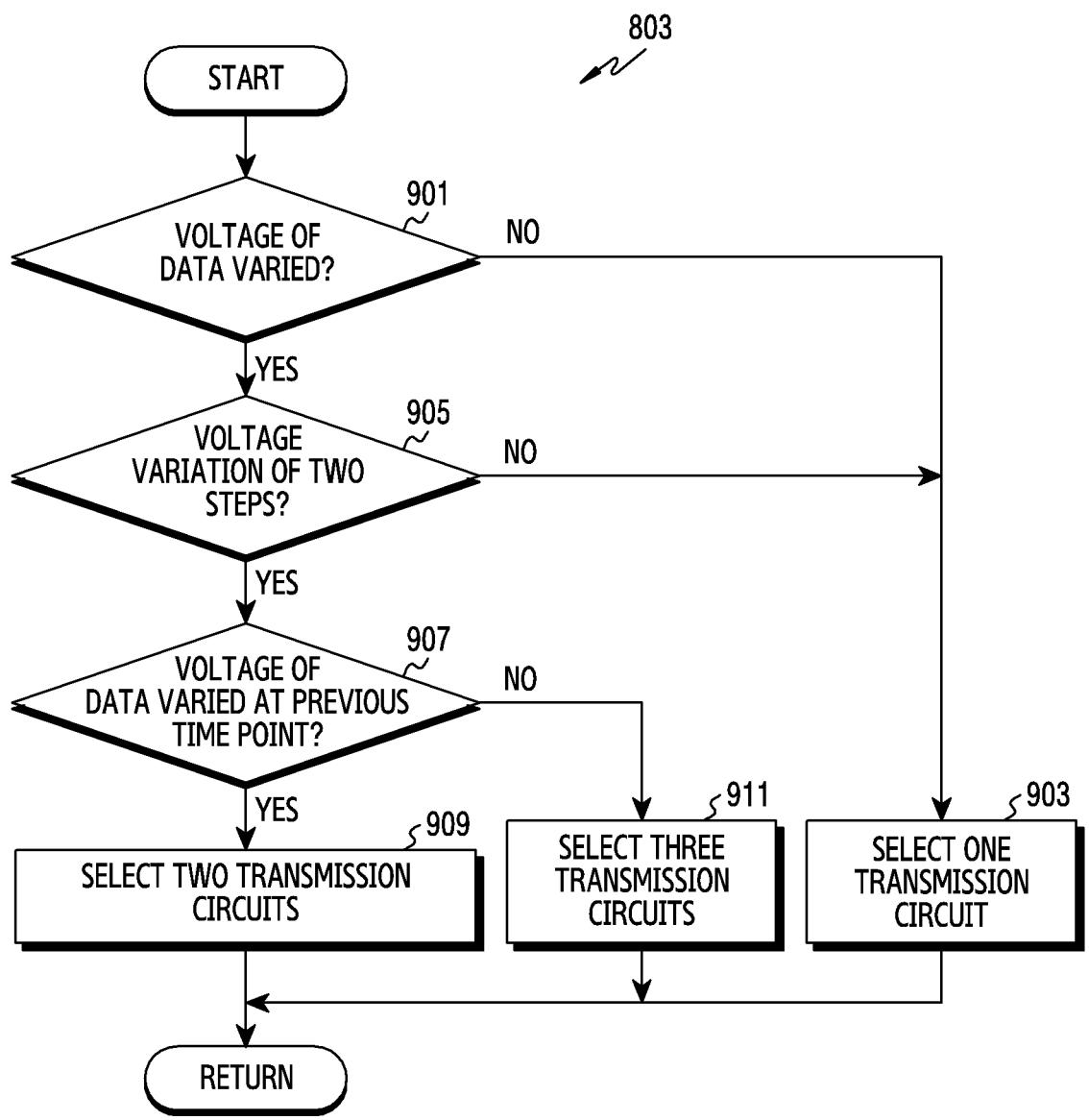
FIG. 9 illustrates a flowchart for selecting a transmission circuit corresponding to a voltage variation in a transmission module of various embodiments of the present disclosure.

FIG. 9 illustrates a flowchart for selecting a transmission circuit corresponding to a voltage variation in a transmission module of various embodiments of the present disclosure. The following description is made for a method for selecting a transmission circuit to be used for data transmission through any one transmission line on the basis of a voltage variation of data in operation 803 of FIG. 8. In the following description, the transmission module may include the whole or part of the transmission module 402 of FIG. 4B or the transmission module 602 of FIG. 6A to FIG. 6E.

Referring to FIG. 9, in operation 901, in response to identifying a voltage of data for transmitting to a reception module through a transmission line (e.g., operation 801 of FIG. 8), the transmission module may identify whether voltage variation of data has occurred in the corresponding transmission line. For example, the transmission module 602 (or the control module 404) may compare a voltage of data transmitted to the reception module 652 at a previous time point (e.g., a previous clock) through the first transmission line 610 and a voltage of data to be transmitted to the reception module 652 at a current time point (e.g., a current clock), to thereby identify whether voltage variation of data has occurred.

In operation 903, in response to the voltage variation of the data not having occurred, the transmission module may select one transmission circuit. For example, in response to voltage variation of data to be transmitted to the reception module 652 through the first transmission line 610 not having occurred, as in FIG. 6A, the transmission module 602 may select one transmission circuit 610-1 so as to transmit data. For instance, the transmission module 602 may switch the remaining transmission circuits 610-2 not selected for data transmission, into an inactive state.

In operation 905, in response to the voltage variation of the data having occurred, the transmission module may identify whether the data voltage variation has been 2-step varied. For example, in response to having transmitted data having a ¾ voltage at the first time point and then having transmitted data having a ¼ voltage at the second time point like the first transmission line 510 of FIG. 5, the transmission module 602 may identify that data voltage variation of two steps has occurred. For example, in response to having transmitted data having a ¼ voltage at the third time point and then having transmitted data having a ¾ voltage at the fourth time point like the second transmission line 520 of FIG. 5, the transmission module 602 may identify that data voltage variation of two steps has occurred.

In response to the data voltage variation having been 1-step varied, in operation 903, the transmission module may select one transmission circuit. For example, in response to obtaining data voltage variation of one step in the first transmission line 610 like the third time point of FIG. 5, the transmission module 602 may identify that a data voltage variation is a first level. As in FIG. 6C, the transmission module 602 may select one transmission circuit 610-1 so as to transmit data. For instance, the transmission module 602 may switch the remaining transmission circuits 610-2 not selected for data transmission into an inactive state.

In operation 907, in response to the data voltage variation having been 2-step varied, the transmission module may identify whether a data voltage has been varied at a previous time point. For example, in response to having transmitted data having a ¼ voltage at the fourth time point and then having transmitted data having a ¾ voltage at the fifth time point like the first transmission line 510 of FIG. 5, the transmission module 602 may identify that the data voltage variation of two steps has occurred at the fifth time point. The transmission module 602 may identify whether voltage variation of data has occurred at the fourth time point. For instance, in response to transmitting data having a ½ voltage at the third time point and then transmitting data having a ¼ voltage at the fourth time point like the first transmission line 510 of FIG. 5, the transmission module 602 may identify that data voltage variation has occurred at the fourth time point.

In operation 909, in response to the data voltage has been varied at the previous time point, the transmission module may select two transmission circuits. For example, in response to the transmission module 602 obtaining data voltage variation of two steps in the first transmission line 610 like the fifth time point of FIG. 5, and data voltage variation occurring at the fourth time point, the transmission module 602 may identify that a data voltage variation is a second level. As in FIG. 6D, the transmission module 602 may select two transmission circuits 610-1 so as to transmit data. For instance, the transmission module 602 may switch the remaining transmission circuit 610-2 not selected for data transmission, into an inactive state.

In operation 911, in response to the data voltage not having been varied at the previous time point, the transmission module may select three transmission circuits. For example, in response to the transmission module 602 obtaining data voltage variation of two steps in the first transmission line 610 like the eighth time point of FIG. 5, and data voltage variation not occurring at the seventh time point, the transmission module 602 may identify that a data voltage variation is a third level. As in FIG. 6E, the transmission module 602 may select three transmission circuits 610-1 so as to transmit data. In detail, in response to a voltage of data transmitted to the reception module 652 being varied differently from a previous time point, the transmission module 602 is not capable of varying the data voltage up to a desired level in a digital interface, because a time (e.g., a rise time or fall time) for varying the data voltage is not enough. Meantime, in response to the data voltage being kept identical with a voltage of the previous time point, the transmission module 602 may vary the data voltage up to the desired level in the digital interface, because the time for varying the data voltage is satisfied. The transmission module 602 may identify that a level of the non-varied data voltage of the previous time point is higher than a level of the varied data voltage of the previous time point. According to this, in response to the transmission module 602 obtaining data voltage variation of two steps, and the data voltage of the previous time point not having been varied, the transmission module 602 may identify that a data voltage variation is a third level.

Figure 10:
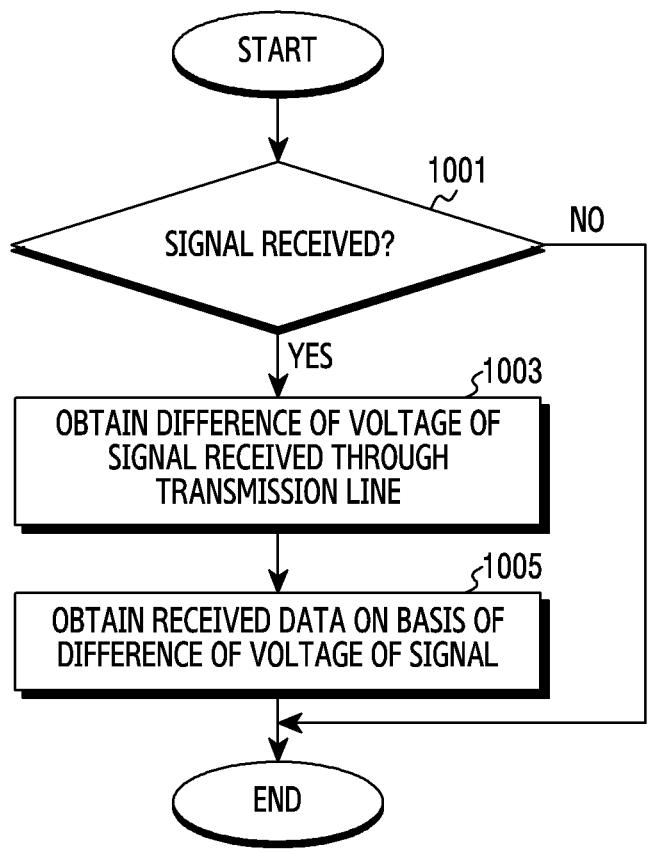
FIG. 10 illustrates a flowchart for obtaining data in a reception module of various embodiments of the present disclosure.

FIG. 10 illustrates a flowchart for obtaining data in a reception module of various embodiments of the present disclosure. In the following description, the reception module may include the whole or part of the reception module 452 of FIG. 4B or the reception module 652 of FIG. 6A to FIG. 6E.

Referring to FIG. 10, in operation 1001, the reception module may identify whether a signal is received from a transmission module through each of transmission lines. For example, in response to being included in the processor 120, the reception module 652 may identify whether data having different voltages are received through the respective transmission lines from the transmission module 602 included in the camera module 180.

In operation 1003, in response to receiving the signal through each of the transmission lines, the reception module may obtain a voltage difference of the signal between the transmission lines on the basis of a voltage of the signal received through each of the transmission lines. For example, the reception module 652 may obtain a difference of a voltage of data received through the second transmission line 620 with a criterion of a voltage of data received through the first transmission line 610, through the first subtracter 660-1 of FIG. 6A. The reception module 652 may obtain a difference of a voltage of data received through the third transmission line 630 with a criterion of the voltage of the data received through the second transmission line 620, through the second subtracter 660-2 of FIG. 6A. The reception module 652 may obtain a difference of the voltage of the data received through the first transmission line 610 with a criterion of the voltage of data received through the third transmission line 630, through the third subtracter 660-3 of FIG. 6A.

In operation 1005, the reception module may obtain bit data transmitted from the transmission module, on the basis of the voltage difference of the signal received through the transmission line. For example, in response to the voltage difference of the signal received through the transmission line being greater than a reference voltage (e.g., 0), the reception module 652 (or the signal obtaining module 470) may obtain bit data of 1. In response to the voltage difference of the signal received through the transmission line being less than the reference voltage (e.g., 0), the reception module 652 may obtain bit data of 0. For instance, the reception module 652 may obtain data of 3 bits per clock through a digital interface of a C-PHY scheme.

Figure 11:
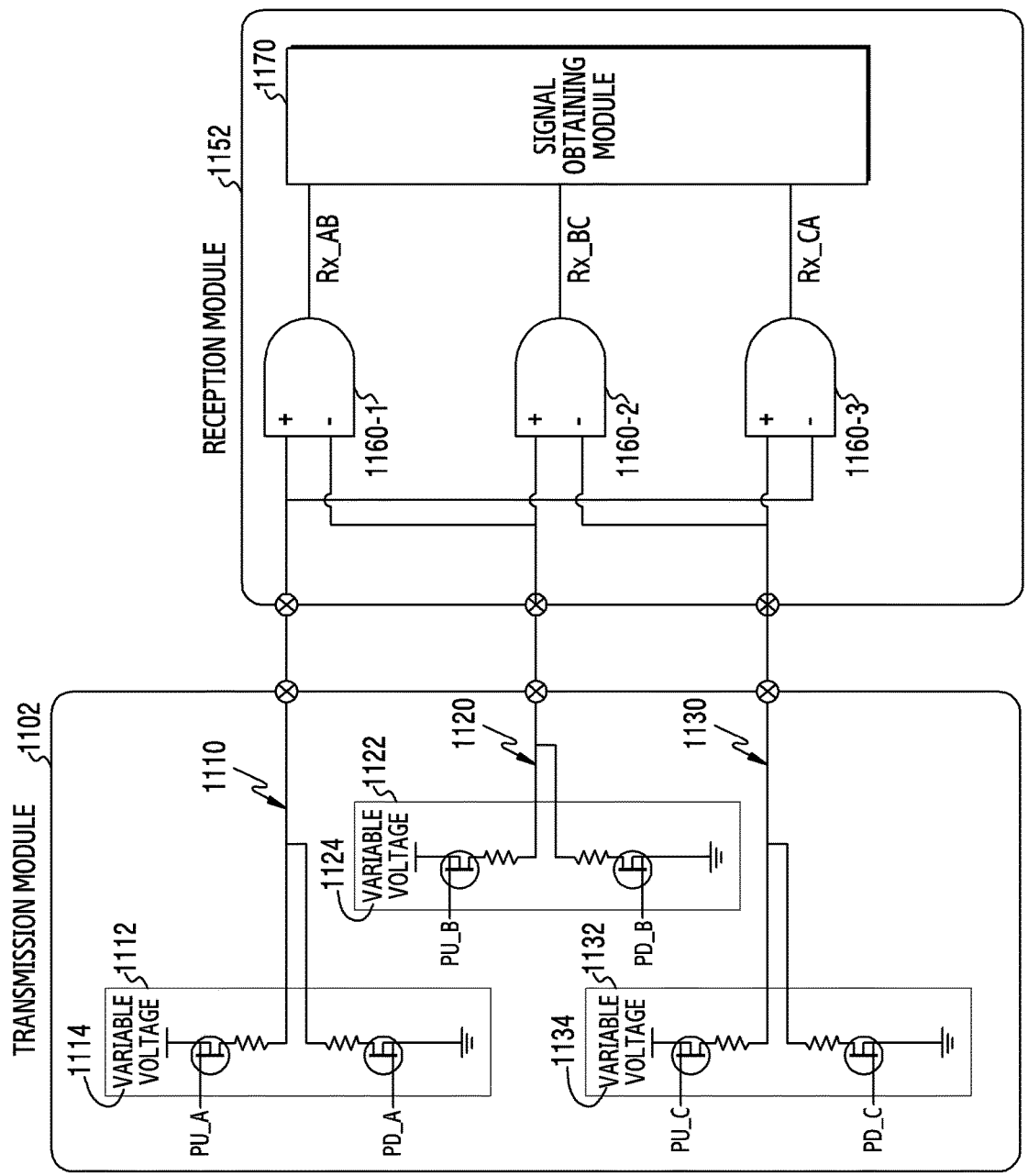
FIG. 11 illustrates a block diagram of an internal interface for adjusting a transmission power of data of various embodiments of the present disclosure.

FIG. 11 illustrates a block diagram of an internal interface of an electronic device for adjusting a transmission power of data of various embodiments of the present disclosure. In the following description, a transmission module 1102 and a reception module 1152 may include the whole or part of the transmission module 402 and the reception module 452 of FIG. 4B. In the following description, the reception module 1152 is constructed identically with the reception module 452 of FIG. 4B and thus, a detailed description is omitted.

Referring to FIG. 11, the transmission module 1102 may include transmission circuits 1112, 1122 and 1132 for transmitting data through each transmission line 1110, 1120 or 1130. For example, each transmission line 1112, 1122 or 1132 may include a pull up device for increasing a voltage of data, a pull down device for decreasing a voltage of data, and a variable voltage 1114, 1124 or 1134.

According to an embodiment, the transmission module 1102 may adjust a value of the variable voltage 1114, 1124 or 1134 of each transmission circuit 1112, 1122 or 1132 to correspond to a voltage variation of data to be transmitted to the reception module 1152 through each transmission line 1110, 1120 or 1130. For example, the transmission module 402 may set the variable voltage 1114, 1124 or 1134 of the transmission circuit relatively high as the voltage variation of the data is large.

Figure 12:
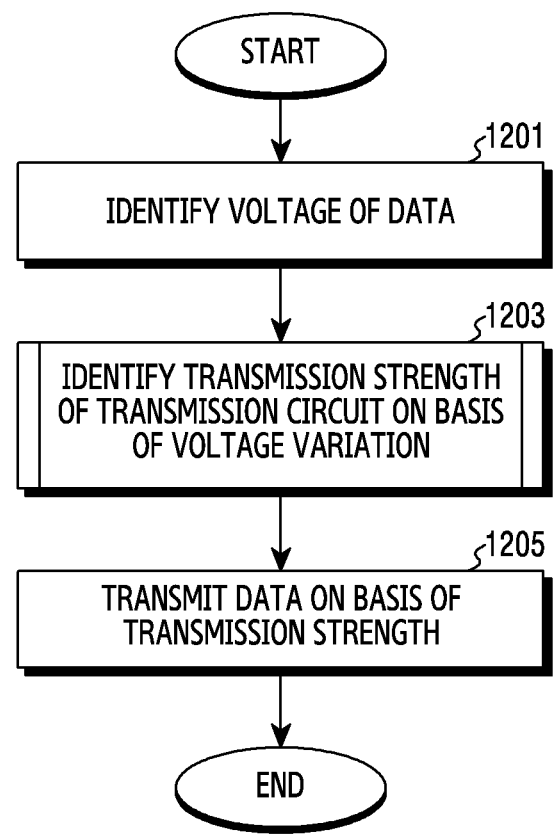
FIG. 12 illustrates a flowchart for transmitting data at a transmission power corresponding to a voltage variation in a transmission module of various embodiments of the present disclosure.

FIG. 12 illustrates a flowchart for transmitting data at a transmission power corresponding to a voltage variation in a transmission module of various embodiments of the present disclosure. In the following description, the transmission module may include the whole or part of the transmission module 1102 of FIG. 11.

Referring to FIG. 12, in operation 1201, the transmission module may identify a voltage of data for transmitting to a reception module through each of transmission lines. For example, in response to being included in the processor 120, the transmission module 1102 may identify bit data for transmitting to the display 160 (e.g., the reception module 1152) through three transmission lines 1110, 1120 and 1130 at a current clock, among data for displaying on the display 160. The transmission module 1102 may identify a voltage of data to be transmitted to the display 160 through each of the transmission lines, in a voltage pattern corresponding to the bit data for transmitting to the display 160.

In operation 1203, the transmission module may identify a transmission strength of a transmission circuit for each of the transmission lines, on the basis of a voltage variation of data for each of the transmission lines. For example, in response to a voltage variation of data for transmitting to the reception module 1152 through the first transmission line 1110 being zero or a first level, the transmission module 1102 (or the control module 404) may set the variable voltage 1114 of the transmission circuit 1112 to one step. For example, in response to a voltage variation of data for transmitting to the reception module 1152 through the second transmission line 1120 being a third level, the transmission module 1120 may set the variable voltage 1124 of the transmission circuit 1122 to three steps. For example, in response to a voltage variation of data for transmitting to the reception module 1152 through the third transmission line 1130 being a second level, the transmission module 1102 may set the variable voltage 1134 of the transmission circuit 1132 to two steps. For instance, the variable voltage may include a high voltage in order of one step, two steps and three steps.

In operation 1205, the transmission module may transmit data to the reception module through each of the transmission lines, on the basis of the transmission strength of the transmission circuit corresponding to the voltage variation of the data. For example, the transmission module may adjust an instantaneous transmission strength of the transmission circuit to correspond to the transmission strength of the transmission circuit corresponding to the voltage variation of the data, and transmit data to the reception module through each of the transmission lines.

According to various embodiments of the present disclosure, the transmission module 602 may identify a transmission strength of a transmission circuit to be used for transmitting data through a transmission line to correspond to a voltage variation of data to be transmitted to the reception module 652 through the transmission line, thereby reducing switching jitter of a digital interface. According to this, the digital interface may secure an optimal eye mask region during signal transmission.

Figure 13:
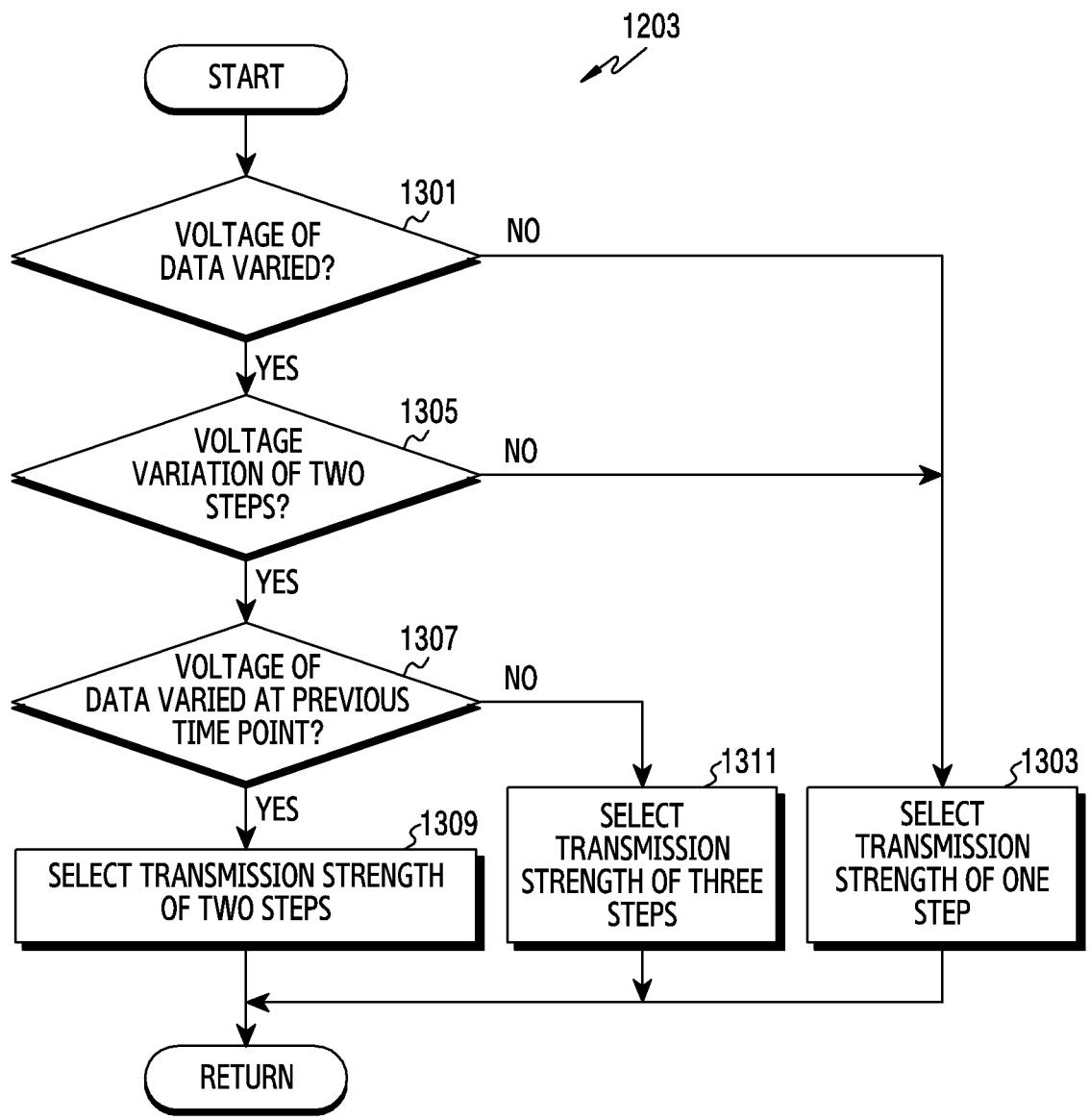
FIG. 13 illustrates a flowchart for identifying a transmission power corresponding to a voltage variation in a transmission module of various embodiments of the present disclosure.

FIG. 13 illustrates a flowchart for identifying a transmission power corresponding to a voltage variation in a transmission module of various embodiments of the present disclosure. The following description is made for a method for identifying a variable voltage of a transmission circuit transmitting data through any one transmission line on the basis of a voltage variation of data in operation 1203 of FIG. 12. In the following description, the transmission module may include the whole or part of the transmission module 1102 of FIG. 11.

Referring to FIG. 13, in operation 1301, in response to identifying a voltage of data for transmitting to a reception module through a transmission line (e.g., operation 1201 of FIG. 12), the transmission module may identify whether voltage variation of data has occurred in the corresponding transmission line. For example, the transmission module 1102 (or the control module 404) may identify whether a voltage of data transmitted to the reception module 1152 during a previous clock through the second transmission line 1120 and a voltage of data to be transmitted to the reception module 1152 during a current clock are mutually different. In response to the data voltages being mutually different, the transmission module 1102 may identify that the data voltage has been varied.

In operation 1303, in response to the voltage variation of the data not having occurred, the transmission module may set a variable voltage of a transmission circuit for a corresponding transmission line, to one step. For example, in response to voltage variation of data to be transmitted to the reception module 1152 through the first transmission line 1110 not having occurred, the transmission module 1102 may set the variable voltage 1114 of the transmission circuit 1112, to one step.

In operation 1305, in response to the voltage variation of the data having occurred, the transmission module may identify whether the data voltage variation has been 2-step varied. For example, in response to having transmitted data having a ¼ voltage at a previous clock through the first transmission line 1110 and then having transmitted data having a ¾ voltage at a current clock, the transmission module 1102 may identify that data voltage variation of two steps has occurred.

In response to the data voltage variation of two steps not having occurred, the transmission module may identify that data voltage variation of one step has occurred. In response to the data voltage variation having been 1-step varied, in operation 1303, the transmission module may set a variable voltage of a transmission circuit of a corresponding transmission line, to one step. For example, in response to voltage variation of data to be transmitted to the reception module 1152 through the second transmission line 1120 having occurred in one step, the transmission module 1102 may identify that a data voltage variation is a first level. According to this, the transmission module 1102 may set the variable voltage 1124 of the transmission circuit 1122 transmitting data through the second transmission line 1120, to one step.

In operation 1307, in response to the data voltage variation having been 2-step varied, the transmission module may identify whether a data voltage has been varied at a previous time point. For example, in response to the data voltage variation having occurred in two steps at a current clock, the transmission module 1102 may identify that the data voltage variation has been obtained at a previous clock.

In operation 1309, in response to the data voltage having been varied at the previous time point, the transmission module may set a variable voltage of a transmission circuit of a corresponding transmission line, to two steps. For example, in response to voltage variation of data to be transmitted to the reception module 1152 through the third transmission line 1130 having occurred in two steps, and the voltage variation of the data having occurred at the previous time point, the transmission module 1102 may identify that a data voltage variation is a second level. According to this, the transmission module 1102 may set the variable voltage 1134 of the transmission circuit 1132 transmitting data through the third transmission line 1130, to two steps.

In operation 1311, in response to the data voltage not having been varied at the previous time point, the transmission module may set a variable voltage of a transmission circuit of a corresponding transmission line, to three steps. For example, in response to voltage variation of data to be transmitted to the reception module 1152 through the first transmission line 1110 having occurred in two steps, and the voltage variation of the data not having occurred at the previous time point, the transmission module 1102 may identify that a data voltage variation is a third level. According to this, the transmission module 1102 may set the variable voltage 1114 of the transmission circuit 1112 transmitting data through the first transmission line 1110, to three steps. For instance, the variable voltage 1114 of three steps may include a voltage greater than the variable voltage 1134 of two steps. The variable voltage 1134 of two steps may include a voltage greater than the variable voltage 1124 of one step.

Figure 14:
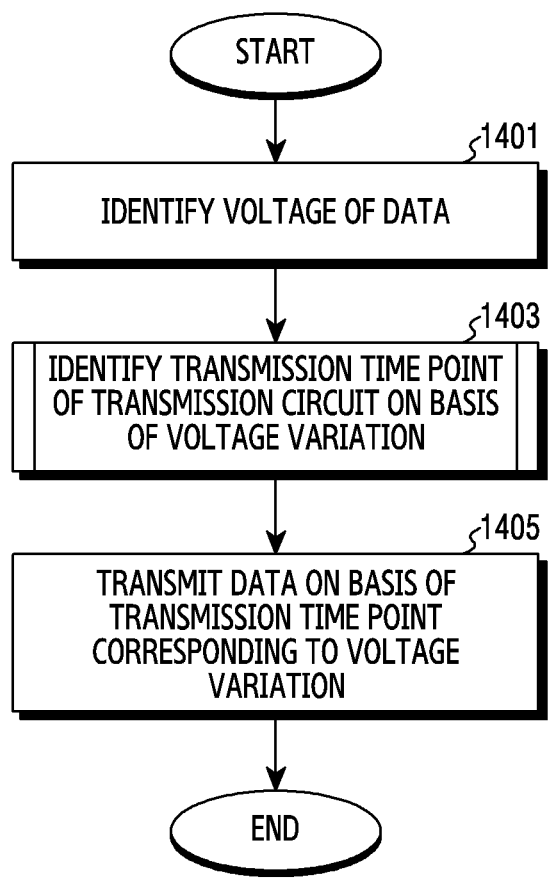
FIG. 14 illustrates a flowchart for adjusting a transmission time point of data to correspond to a voltage variation in a transmission module of various embodiments of the present disclosure.

FIG. 14 illustrates a flowchart for adjusting a transmission time point of data to correspond to a voltage variation in a transmission module of various embodiments of the present disclosure. In the following description, the transmission module may include the whole or part of the transmission module 402 of FIG. 4B.

Referring to FIG. 14, in operation 1401, the transmission module may identify a voltage of data to be transmitted to a reception module through each of transmission lines included in a digital interface. For example, the transmission module 402 may identify a voltage of data to be transmitted to the reception module 452 through each of the transmission lines, on the basis of a voltage pattern corresponding to bit data for transmitting to the reception module 452 through three transmission lines 410, 420 and 430 at a current time point. For instance, the transmission module 402 may be included in the first internal module 400 (e.g., the camera module 180 or the processor 120) included in the electronic device 101, and the reception module 452 may be included in the second internal module 450 (e.g., the processor 120 or the display 160) connected with the first internal module 400 through the digital interface.

In operation 1403, the transmission module may identify a transmission time point of data through each of the transmission lines, on the basis of a voltage variation of data to be transmitted through each of the transmission lines. For example, the transmission module 402 may identify a transmission time point of data in inverse proportion to a voltage variation of data. In detail, in response to a voltage of data to be transmitted through the first transmission line 410 not being varied, or a voltage variation of data being a first level, the transmission module 402 may identify a transmission time point of data to be transmitted through the first transmission line 410, on the basis of a delay time of two steps. In response to a voltage variation of data to be transmitted through the third transmission line 430 being a second level, the transmission module 402 may identify a transmission time point of data to be transmitted through the third transmission line 430, on the basis of a delay time of one step. In response to a voltage variation of data to be transmitted through the second transmission line 420 being a third level, the transmission module 402 may identify a transmission time point of data to be transmitted through the second transmission line 420, without considering a delay time. For instance, a duration of the delay time may get long in order of one step and two steps.

In operation 1405, the transmission module may transmit data to the reception module through each of the transmission lines, on the basis of the transmission time point corresponding to the voltage variation of the data. For example, the transmission module 402 may delay data using a buffer, thereby transmitting the data through each of the transmission lines at the transmission time point corresponding to the voltage variation of the data.

According to various embodiments of the present disclosure, the transmission module 602 may dynamically control a transmission time point of data to be transmitted through a transmission line to correspond to a voltage variation of the data to be transmitted to the reception module 652 through the transmission line, thereby implementing a uniform cross point in a digital interface. According to this, the digital interface may secure an optimal eye mask region during signal transmission.

Figure 15:
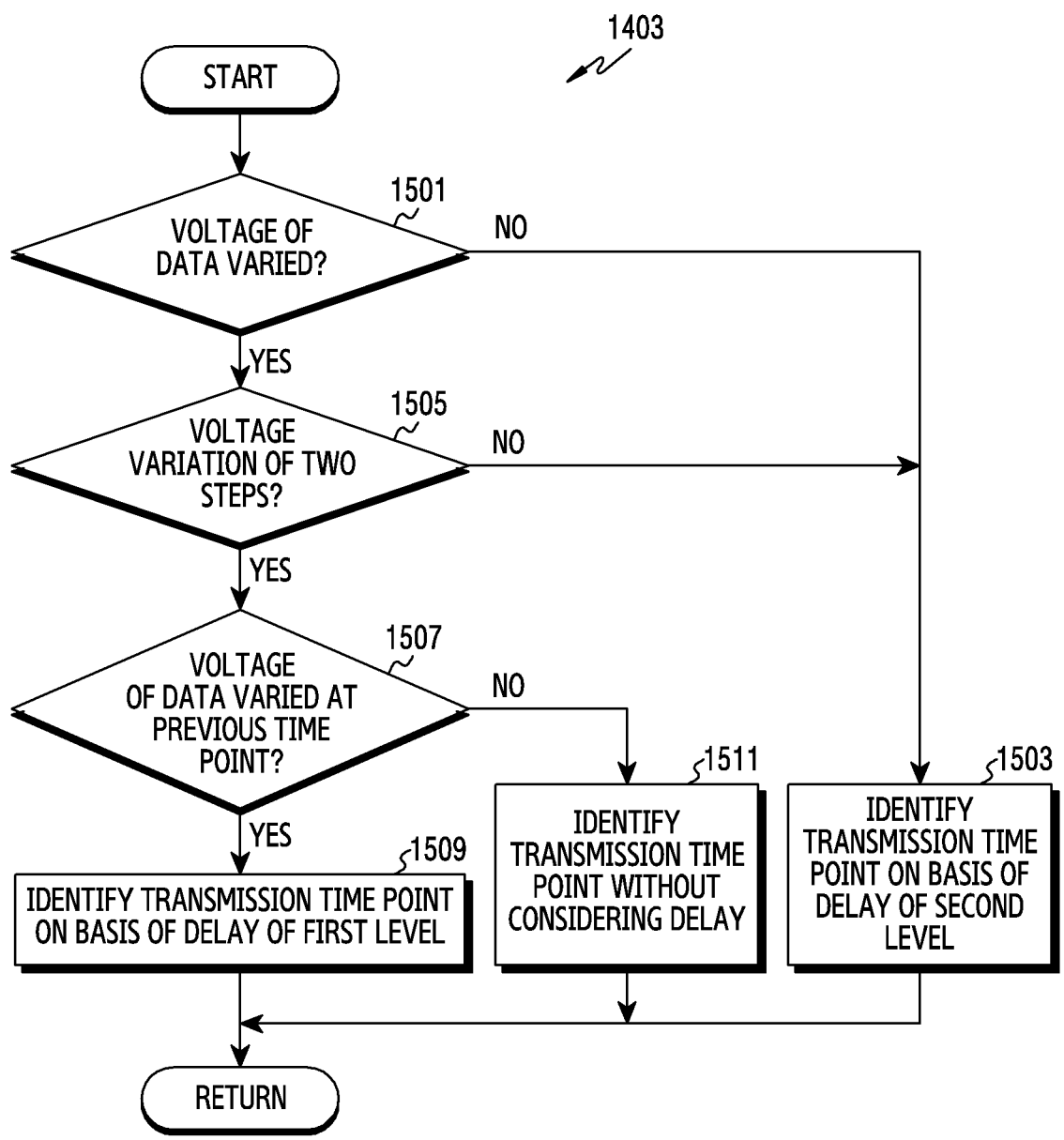
FIG. 15 illustrates a flowchart for identifying a transmission time point corresponding to a voltage variation in a transmission module of various embodiments of the present disclosure.

FIG. 15 illustrates a flowchart for identifying a transmission time point corresponding to a voltage variation in a transmission module of various embodiments of the present disclosure. The following description is made for a method for identifying a transmission time point of data to be transmitted through any one transmission line on the basis of a voltage variation of data in operation 1403 of FIG. 14. In the following description, the transmission module may include the whole or part of the transmission module 402 of FIG. 4B.

Referring to FIG. 15, in operation 1501, in response to identifying a voltage of data to be transmitted to a reception module through a transmission line (e.g., operation 1401 of FIG. 14), the transmission module may identify whether voltage variation of data has occurred with a criterion of a voltage of data transmitted at a previous time point in a corresponding transmission line. For example, the transmission module 402 may compare a voltage of data transmitted to the reception module 452 at a previous time point through the third transmission line 430 and a voltage of data to be transmitted to the reception module 1152 at a current time point. In response to the data voltages of the previous time point and the current time point being mutually different, the transmission module 1102 may identify that the data voltage has been varied.

In operation 1503, in response to voltage variation of data of the current time point not having occurred with a criterion of the data voltage of the previous time point, the transmission module may identify a transmission time point of data for a corresponding transmission line on the basis of a delay time of a second level.

In operation 1505, in response to the voltage variation of the data of the current time point having occurred with a criterion of the data voltage of the previous time point, the transmission module may identify whether data voltage variation of two steps has occurred. For example, the transmission module 402 may identify whether a voltage (e.g., ¼ voltage) of data transmitted at the previous time point through the second transmission line 420 and a voltage (e.g., ¾ voltage) of data to be transmitted at the current time point identified in operation 1401 of FIG. 14 have a voltage difference of two steps.

In response to the data voltage variation of two steps not having occurred, the transmission module may identify that data voltage variation of one step has occurred. According to this, in operation 1503, the transmission module may identify a transmission time point of data for a corresponding transmission line on the basis of the delay time of the second level.

In operation 1507, in response to the data voltage variation of two steps having occurred, the transmission module may identify whether data voltage variation has occurred at a previous time point. For example, the transmission module 402 may identify whether the data voltage variation has occurred at the previous time point through a voltage variation sequence of data transmitted to the reception module 452 through the transmission line.

In operation 1509, in response to the data voltage having been varied at the previous time point, the transmission module may identify a transmission time point of data for a corresponding transmission line, on the basis of a delay time of a first level. For instance, the delay time of the first level may be set as a time shorter than the delay time of the second level. The delay time of the first level and the delay time of the second level may be variably set according to a characteristic of data transmitted from the transmission module.

In operation 1511, in response to the data voltage not having been varied at the previous time point, the transmission module may identify a transmission time point of data for a corresponding transmission line, without considering a delay of data.

The term "module" as used herein may, for example, include a unit configured by hardware, software, or firmware. The "module" may be interchangeably used with, for example, the term "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC)

chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130. The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hadware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

An embodiment disclosed in the present disclosure is provided merely to easily describe technical details and to help the understanding of the technical details, and is not intended to limit the scope of various embodiments of the present disclosure. Therefore, it should be understood that the scope of various embodiments of the present disclosure includes all modifications based on the technical idea of various embodiments of the present disclosure or various other embodiments of the present disclosure.

What is claimed is:
1. A transmission apparatus comprising:
multiple transmission lines connected to a destination circuit; and
for each one of the multiple transmission lines, a multiple transmission circuits connected in parallel to each other and the one of the multiple transmission lines,
wherein the transmission apparatus is configured to transmit data using different voltages to the destination circuit, using a number of transmission circuits among the multiple transmission circuits connected to each of the transmission lines, the number selected based at least in part on an amount of voltage variation of voltage corresponding to data and voltage corresponding to data transmitted at a previous time point, for data to be transmitted through each of the transmission lines.

2. The transmission apparatus of claim 1, wherein the transmission apparatus is configured to, in response to the voltage corresponding to data to be transmitted through the transmission line being maintained, transmit data to the destination circuit, using one transmission circuit among the multiple transmission circuits connected in parallel to the transmission line.

3. The transmission apparatus of claim 1, wherein the transmission apparatus is configured to, in response to the voltage corresponding to data to be transmitted through the transmission line being one-step varied with the voltage corresponding to data transmitted to the destination circuit at a previous time point, transmit data to the destination circuit, using one transmission circuit among the multiple transmission circuits connected in parallel to the transmission line.

4. The transmission apparatus of claim 1, wherein the transmission apparatus is configured to, in response to the voltage of corresponding to data to be transmitted through the transmission line being two-step varied with the voltage corresponding to data transmitted to the destination circuit at a previous time point, and the voltage corresponding to data being varied at the previous time point, transmit data to the destination circuit, using two transmission circuits among the multiple transmission circuits connected in parallel to the transmission line.

5. The transmission apparatus of claim 1, wherein the transmission apparatus is configured to, in response to the voltage corresponding to data to be transmitted through the transmission line being two-step varied with the voltage corresponding to data transmitted to the destination circuit at the previous time point, and the voltage corresponding to data being maintained at the previous time point, transmit data to the destination circuit, using three transmission circuits among the multiple transmission circuits connected in parallel to the transmission line.

6. The transmission apparatus of claim 1, wherein each transmission circuit comprises a pull up device and a pull down device which are connected with a corresponding transmission line.

7. The transmission apparatus of claim 1, wherein the apparatus comprises a digital interface of a C-PHY scheme.

8. The transmission apparatus of claim 1, further comprising a control module configured to select numbers of transmission circuits to be used for transmitting data for each of the transmission line, on the basis of the voltage variations of voltage corresponding to the data to be transmitted through each of the transmission lines and the voltage corresponding to data transmitted through each of the transmission lines at the previous time point.

9. The transmission apparatus of claim 1, wherein the transmission apparatus is configured to transmit data through each of the transmission lines, based on a transmission time point corresponding to a voltage variation of data to be transmitted.

10. The transmission apparatus of claim 9, wherein the transmission apparatus is configured to:
in response to the voltage of the data being maintained, identify the transmission time point of the data based on first delay time; and
transmit the data, based on the identified transmission time point.

11. The transmission apparatus of claim 9, wherein the transmission apparatus is configured to:
in response to the voltage of the data being two-step varied with the voltage corresponding to data transmitted to the destination circuit at a previous transmission time point, identify the transmission time point of the data based on second delay time; and
transmit the data, based on the identified transmission time point.

12. An method of a transmission apparatus of a digital interface which comprises multiple transmission lines connected with a destination circuit, the method comprising:

identifying a voltage corresponding to data to be transmitted through each of the transmission lines;

selecting numbers of transmission circuits to be used for data transmission among multiple transmission circuits connected in parallel to each other and provided for each of the transmission lines, on the basis of a voltage variation of voltage corresponding to data to be transmitted through each of the transmission lines and a voltage corresponding to data transmitted at a previous time point; and transmitting data having different corresponding voltages to the destination circuit through the selected numbers of transmission circuit for each of the transmission lines.

13. The method of claim 12, wherein selecting the transmission circuit comprises, in response to the voltage corresponding to the data to be transmitted through the transmission line being maintained, selecting any one transmission circuit among the multiple transmission circuits connected in parallel to the transmission line.

14. The method of claim 12, wherein selecting the transmission circuit comprises, in response to the voltage corresponding to the data to be transmitted through the transmission line being one-step varied with the voltage corresponding to data transmitted to the destination circuit at the previous time point, selecting any one transmission circuit among the multiple transmission circuits connected in parallel to the transmission line.

15. The method of claim 12, wherein selecting the transmission circuit comprises:

in response to the voltage corresponding to the data to be transmitted through the transmission line being two-step varied with the voltage corresponding to data transmitted to the destination circuit at the previous time point, identifying whether the voltage corresponding to the data was varied at the previous time point; and in response to the voltage corresponding to the data having been varied at the previous time point, selecting two transmission circuits among the multiple transmission circuits connected in parallel to the transmission line.

16. The method of claim 15, further comprising, in response to the voltage corresponding to the data being maintained at the previous time point, selecting three transmission circuits among the multiple transmission circuits connected in parallel to the transmission line.

17. The method of claim 12, wherein the digital interface comprises a digital interface of a C-PHY scheme.

18. The method of claim 12, wherein the transmitting of data further comprises transmitting data through at least one transmission circuit, based on a transmission time point corresponding to a voltage variation corresponding to the data for each of the transmission lines.

19. The method of claim 18, wherein the transmitting of data further comprises:

in response to the voltage corresponding to the data being maintained, identifying the transmission time point of the data based on first delay time; and transmuting the data, based on the identified transmission time point.

20. The method of claim 19, wherein the transmitting of data further comprises:

in response to the voltage of the data being two-step varied with the voltage corresponding to data transmitted to the destination circuit at the previous time point, identifying the transmission time point of the data based on second delay time; and transmitting the data, based on the identified transmission time point.

* * * * *